(12) United States Patent
Alpert et al.

(10) Patent No.: US 7,389,403 B1
(45) Date of Patent: Jun. 17, 2008

(54) ADAPTIVE COMPUTING ENSEMBLE MICROPROCESSOR ARCHITECTURE

(75) Inventors: Donald B. Alpert, Phoenix, AZ (US); John Gregory Favor, Scotts Valley, CA (US); Peter N. Glaskowsky, Cupertino, CA (US); Seungyoon Peter Song, East Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 11/277,761

(22) Filed: Mar. 29, 2006

Related U.S. Application Data

(60) Provisional application No. 60/707,070, filed on Aug. 10, 2005, provisional application No. 60/751,398, filed on Dec. 17, 2005, provisional application No. 60/758,485, filed on Jan. 11, 2006, provisional application No. 60/759,484, filed on Jan. 17, 2006, provisional application No. 60/777,015, filed on Feb. 25, 2006.

(51) Int. Cl.
*G06F 9/38* (2006.01)
(52) U.S. Cl. ........................................ 712/10
(58) Field of Classification Search ................ 712/10, 712/228, 205, 215, 13
See application file for complete search history.

(56) References Cited

U.S. PATENT DOCUMENTS

| | | | | |
|---|---|---|---|---|
| 6,079,008 A * | 6/2000 | Clery, III | ...................... | 712/11 |
| 6,092,153 A * | 7/2000 | Lass | ........................... | 711/133 |
| 6,745,318 B1 | 6/2004 | Mansingh | | |
| 6,748,556 B1 * | 6/2004 | Storino et al. | ................ | 714/42 |
| 7,020,800 B2 * | 3/2006 | Fu et al. | ....................... | 714/38 |
| 7,035,997 B1 * | 4/2006 | Musoll et al. | .............. | 712/205 |
| 7,035,998 B1 * | 4/2006 | Nemirovsky et al. | ........ | 712/215 |
| 7,093,109 B1 * | 8/2006 | Davis et al. | ................ | 712/228 |
| 7,155,600 B2 * | 12/2006 | Burky et al. | ................ | 712/229 |
| 2004/0216102 A1 * | 10/2004 | Floyd | ........................ | 718/100 |
| 2004/0216104 A1 * | 10/2004 | Fluhr et al. | ................. | 718/100 |
| 2005/0125629 A1 * | 6/2005 | Kissell | ......................... | 712/1 |
| 2005/0132238 A1 * | 6/2005 | Nanja | .......................... | 713/300 |
| 2005/0182915 A1 * | 8/2005 | Devaney et al. | ............. | 712/10 |
| 2006/0248317 A1 | 11/2006 | Vorbach | | |

OTHER PUBLICATIONS

Khailany,B etal Imagine; Media Processing With Streams, 2001, IEEE.*
Khailany, Brucek, et al., Imagine: Media Processing With Streams, 2001, IEEE, pp. 35-46.*
Excel Spreadsheet of Dec. 16, 2007 identifying references used to reject claims in related applications.

* cited by examiner

*Primary Examiner*—Eric Coleman
(74) *Attorney, Agent, or Firm*—PatentVentures; Bennett Smith; Korbin Van Dyke

(57) ABSTRACT

An Adaptive Computing Ensemble (ACE) includes a plurality of flexible computation units as well as an execution controller to allocate the units to Computing Ensembles (CEs) and to assign threads to the CEs. The units may be any combination of ACE-enabled units, including instruction fetch and decode units, integer execution and pipeline control units, floating-point execution units, segmentation units, special-purpose units, reconfigurable units, and memory units. Some of the units may be replicated, e.g. there may be a plurality of integer execution and pipeline control units. Some of the units may be present in a plurality of implementations, varying by performance, power usage, or both. The execution controller dynamically alters the allocation of units to threads in response to changing performance and power consumption observed behaviors and requirements. The execution controller also dynamically alters performance and power characteristics of the ACE-enabled units, according to the observed behaviors and requirements.

24 Claims, 8 Drawing Sheets

ADAPTIVE COMPUTING ENSEMBLE MICROPROCESSOR ARCHITECTURE

CROSS REFERENCE TO RELATED APPLICATIONS

Priority benefit claims for this application are made in the accompanying Application Data Sheet (if any). To the extent permitted by the type of the instant application, this application incorporates by reference for all purposes the following applications, which are all owned by the owner of the instant application:

U.S. Provisional Application Ser. No. 60/707,070, filed Aug. 10, 2005, by Donald Alpert, et al., and entitled ADAPTIVE COMPUTING ENSEMBLE MICROPROCESSOR ARCHITECTURE;

U.S. Provisional Application Ser. No. 60/751,398, filed Dec. 17, 2005, by Donald Alpert, et al., and entitled ADAPTIVE COMPUTING ENSEMBLE MICROPROCESSOR ARCHITECTURE;

U.S. Provisional Application Ser. No. 60/758,485, filed Jan. 11, 2006, by Donald Alpert, et al., and entitled MICROPROCESSOR ARCHITECTURE WITH RECONFIGURABLE FUNCTION UNITS;

U.S. Provisional Application Ser. No. 60/759,484, filed Jan. 17, 2006, by Donald Alpert, et al., and entitled ADAPTIVE COMPUTING ENSEMBLE MICROPROCESSOR ARCHITECTURE;

U.S. Provisional Application Ser. No. 60/777,015, filed Feb. 25, 2006, by Donald Alpert, et al., and entitled ADAPTIVE COMPUTING ENSEMBLE MICROPROCESSOR ARCHITECTURE;

U.S. Non-Provisional application Ser. No. 11/277,762 filed herewith, by Donald Alpert, et al., and entitled MICROPROCESSOR ARCHITECTURE WITH RECONFIGURABLE FUNCTION UNITS;

U.S. Non-Provisional application Ser. No. 11/277,763 filed herewith, by Donald Alpert, et al., and entitled STATICALLY CONFIGURED MICROPROCESSOR ARCHITECTURE;

U.S. Non-Provisional application Ser. No. 11/277,764 filed herewith, by Donald Alpert, et al., and entitled CONFIGURABLE MULTI-CORE PROCESSOR IMPLEMENTING VIRTUAL PROCESSORS; and U.S. Non-Provisional application Ser. No. 11/277,765 filed herewith, by Donald Alpert, et al., and entitled THREAD MIGRATION AND RECONFIGURATION OF A MULTI-CORE PROCESSOR.

BACKGROUND

1. Field

Advancements in microprocessor architecture are needed to provide improvements in performance, efficiency, cost, power tradeoffs, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes. Nothing herein is to be construed as an admission that any of the references are pertinent prior art, nor does it constitute any admission as to the contents or date of actual publication of these documents.

Semiconductor fabrication technology has undergone continuous improvement for four decades at a rate defined by Moore's Law: The number of transistors integrated in a single circuit has grown by a factor of four every three years. Such continuous improvement has allowed the number of transistors available for a single-chip microprocessor to increase from several thousand transistors for the first microprocessor in 1971 to more than one billion transistors currently.

As technology advanced through the early 1980's, integration levels of about 100,000 transistors per chip made it possible to develop a complete processor partitioned into a handful of components, such as a 32-bit integer pipeline, a 64-bit FP pipeline, a memory-management unit, and cache memory. Around 1990, technology permitted integration of about one million transistors, enabling a complete processor to be fabricated in a single chip. As the technology continued to advance through about 1995, microprocessors began to replicate multiple functional units to execute instructions in parallel, a type of computer architecture called "superscalar" that exploits ILP. Further integration through about 2000 led to microprocessors that executed multiple threads on a common set of functional units, a type of architecture called SMT that exploits TLP. Presently, multiple complete processors are being integrated on a single chip, a type of architecture known as CMP.

As the level of integration reaches one billion transistors and beyond, several limitations of technology and applications have grown increasingly important. One technology limitation is in the amount of power that can be supplied and dissipated economically by a single chip. A related limitation is the amount of energy that can be stored in batteries or other power sources for portable applications. In addition to dynamic power, which is dissipated as devices switch, static power caused by leakage current becomes more important as transistor size is reduced. Another technology limitation is that interconnection characteristics do not scale with transistor size and speed, so interconnection of transistors and logic blocks becomes increasingly important in determining overall chip size, power, and performance. Technology further limits chip yield and reliability as device sizes shrink and more devices are integrated. The characteristics of software applications impose additional limitations in the amount of ILP and TLP that can be exploited by individual processors, as well as further limitations that arise when memory used by an application is partitioned across multiple processors.

A number of techniques have been practiced and proposed to address such limitations. For an individual processor, clocks may be gated off to idle logic, and voltage may be lowered to reduce power consumption. Such voltage-scaling techniques also reduce operating frequency and consequently performance. Similar techniques may be applied to complete processors for CMP applications. For example, complete processors may have clocks gated off or the power supply may be disconnected. In practice, such techniques provide coarse control over the tradeoffs between power and performance.

Contemporary techniques provide additional flexibility with asymmetric processors in CMP or multi-chip configurations. For example, an integrated circuit may integrate one large, high-performance processor and a second smaller, lower-power and lower-performance processor. Either or both complete processors may be active depending on application performance requirements, power limitations, and battery life. The processors may also be implemented in separate voltage domains, so that voltage-scaling techniques may be applied separately to individual processors. In addition, techniques have been proposed to provide asymmetric functional units within a processor. For example, a processor may integrate two integer ALUs with differing power and performance. The processor may be configured to execute instructions using either or both ALUs.

Currently practiced and proposed techniques still suffer a number of disadvantages. For example, when asymmetric processors are employed, the resources of an inactive processor are unavailable and wasted. In addition, the resources of an active processor may be underutilized; for example, the FPU of a high-performance processor is underutilized when the processor is allocated to an application that executes FP instructions infrequently or not at all. When asymmetric functional units are employed, the additional unused resources result in unnecessary interconnection, leading to lower performance and additional power dissipation. When voltage is scaled, the processor needs to remain idle for considerable time until clocks are stable at a new frequency appropriate for the scaled voltage.

Throughout the evolution of microprocessor technology it has also been necessary to make tradeoffs between fixed-function and programmable components. Fixed-function components may be optimized for manufacturing cost and performance, but their market volume is limited by demands of their target application(s). Programmable components may have higher manufacturing cost and lower performance for a specific application, but the programmable capability enables much higher volumes covering a range of applications. In addition, programmable components may be more economical because development costs are spread over a larger manufacturing volume. Similarly, systems developed with programmable components may be brought to market more quickly than those developed with fixed-function components because the time to complete and correct a program is generally less than the time to develop a new fixed-function circuit.

As a consequence of the tradeoffs between fixed-function and programmable elements, applications are commonly transitioned from fixed-function solutions to programmable solutions as circuit costs decrease and performance increases over time. For example, the first microprocessor was introduced in 1971 by Intel as an alternate solution to developing a calculator with fixed-function circuits. Similarly, gate arrays have been applied to customize functions either by programming metal interconnections between logic blocks during the last manufacturing steps or else after the circuit is manufactured by blowing fuse connections. Further advances have enabled functions to be customized by loading the contents of SRAM cells associated with programmable logic gates and interconnection, a technology called Field-Programmable Gate Arrays (FPGAs). FPGAs enable functions to be programmed multiple times after manufacturing, a characteristic often described as reconfigurable.

Microprocessors occupy a unique position on the spectrum of fixed-function and programmable components: microprocessors may be programmed, but they commonly implement a fixed-function, namely executing instructions of a predefined architecture. For example, x86 processors, used extensively in IBM-compatible computer systems, generally execute a fixed set of instructions, but are programmed for a wide variety of applications.

Interest has grown in making microprocessors more configurable; that is, in supplementing a microprocessor that executes a standard instruction set with fixed functions that have been optimized for a specific application. What are needed to address the challenges in microprocessor resource management and reconfiguration are improved microprocessor architectures to provide enhanced and superior power efficiency as well as performance characteristics and tradeoffs thereof.

SUMMARY

The invention may be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Illustrative Combinations that tersely summarize illustrative systems and methods in accordance with the concepts taught herein. As is discussed in more detail in the Conclusions, the invention encompasses all possible modifications and variations within the scope of the issued claims, which are appended to the very end of the issued patent.

DETAILED DESCRIPTION

Figure 1:
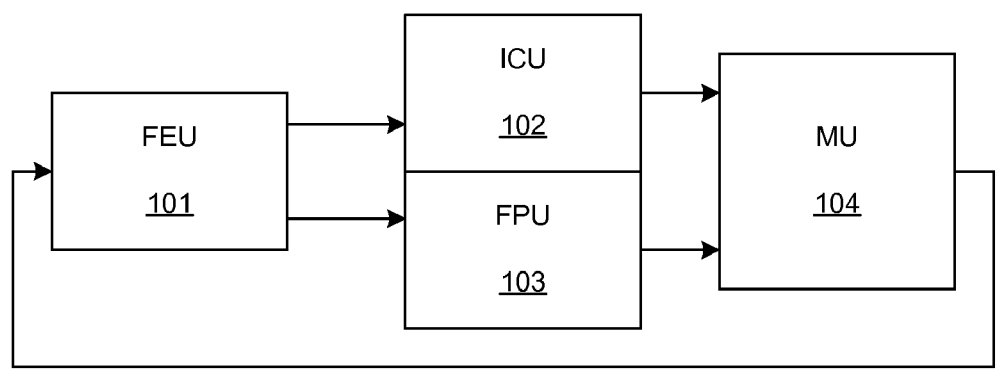
FIG. 1 illustrates selected details of an embodiment of a processor organization including an FEU, an ICU, an FPU, and an MU.

A detailed description of one or more embodiments of the invention is provided below along with accompanying figures that illustrate the principles of the invention. Some of the embodiments or variations thereof may be characterized as "notable." The invention is described in connection with the embodiments, which are understood to be merely illustrative and not limiting. The invention is expressly not limited to or by any or all of the embodiments herein (notable or otherwise). The scope of the invention is limited only by the claims appended to the end of the issued patent and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

INTRODUCTION

This introduction is included only to facilitate the more rapid understanding of the Detailed Description. The invention is not limited to the concepts presented in the introduction, as the paragraphs of any introduction are necessarily an abridged view of the entire subject and are not meant to be an exhaustive or restrictive description. For example, the introduction that follows provides overview information limited by space and organization to only certain embodiments. There are in fact many other embodiments, including those to which claims will ultimately be drawn, which are discussed throughout the balance of the specification.

Acronyms

Elsewhere herein various shorthand abbreviations, or acronyms, are used to refer to certain elements. The descriptions of the acronyms follow.

| Acronym | Description |
| --- | --- |
| ACE | Adaptive Computing Ensemble |
| ALU | Arithmetic-Logic Unit |
| BIOS | Basic Input/Output System |
| BU | Build Unit |
| CE | Computing Ensemble |
| CMP | Chip-level Multi-Processing |
| DC | Data Cache |
| DES | Data Encryption Standard |
| DRAM | Dynamic Random-Access Memory |
| DTLB | Data TLB |
| EU | Execution Unit |
| FDU | Fetch and Decode Unit |
| FEU | Front-End Unit |
| FP | Floating-Point |
| FPGA | Field-Programmable Gate Array |
| FPU | Floating-Point Unit |
| ICU | Integer and Control Unit |
| ILP | Instruction-Level Parallelism |
| IU | Integer Unit |
| L2$ | second-level cache |
| L2C | Level-2 Cache sub-system |
| MCU | Master Control Unit |
| MMX | MultiMedia eXtension |
| MU | Memory Unit |
| PC-NB | ACE-Enabled PC NoteBook Embodiment |
| PLA | Programmed Logic Array |
| ROM | Read-Only Memory |
| RSA | Rivest, Shamir, and Adleman |
| RU | Reconfigurable Unit |
| SIMD | Single-Instruction-Multiple-Data |
| SMT | Simultaneous Multi-Threading |
| SPU | Special-Purpose Unit |
| SSE | Streaming SIMD Extensions |
| SU | Segmentation Unit |
| TC | Trace Cache |
| TCP/IP | Transmission Control Protocol/Internet Protocol |
| TLB | Translation Look-aside Buffer |
| TLP | Thread-Level Parallelism |
| VGA | Video Graphics Array |

A novel form of microprocessor architecture, an Adaptive Computing Ensemble (ACE), is disclosed that provides more continuous tradeoffs between performance and power, is less wasteful of silicon resources, and reduces interconnection paths critical for performance compared to conventional approaches. In one embodiment, multiple threads are executed using a collection of units implemented in accordance with the ACE microarchitecture. The so-called "ACE-enabled" units, in one embodiment, may include a single instance of an FEU, an FPU, and an L2C together with multiple instances of ICUs. Characteristics of the execution units and memory structures are varied under control of an MCU. The MCU dynamically allocates and assigns resources to threads. ACE microprocessor architecture techniques enable more flexible, dynamic tradeoffs among cost, performance, and power than other microprocessor architecture techniques.

A new Reconfigurable Unit (RU) is also disclosed that may be used in conventional microprocessor architecture implementations as well as ACE microarchitecture implementations. In a first aspect the RU may be reconfigured to execute portions of a predetermined instruction set more efficiently than without reconfiguration. In a second aspect the RU may be reconfigured to execute an alternate instruction set. Thus the RU enables reconfigurable microarchitecture implementations targeted to match system workload dynamically, thus reducing system cost and power consumption while improving system performance.

In the first aspect the RU is reconfigured (i.e. the function of the RU is changed via reconfiguration) to execute portions of the predetermined instruction set. Thus, instructions of the predetermined instruction set that are infrequently used may be supported without incurring cost and power of circuitry dedicated to the infrequently executed instructions. Alternatively, the RU may be reconfigured to optimize performance and/or power consumption of frequently executed instructions or sequences of instructions from the predetermined instruction set. In the second aspect the RU may be reconfigured to execute the alternate instruction set, i.e. instructions different from that of the predetermined instruction set. Thus the RU may implement varying functions over time to improve overall system performance, cost, and power consumption.

According to one view an ACE includes a plurality of flexible computation units as well as an execution controller to allocate the units to CEs and to assign threads to the CEs. The units may be any combination of ACE-enabled units, including instruction fetch and decode units, integer execution and pipeline control units, floating-point execution units, segmentation units, special-purpose units, reconfigurable units, and memory units. Some of the units may be replicated, e.g. there may be a plurality of integer execution and pipeline control units. Some of the units may be present in a plurality of implementations, varying by performance, power usage, or both. The execution controller dynamically alters the allocation of units to threads in response to changing performance and power consumption observed behaviors and requirements. The execution controller also dynamically alters performance and power characteristics of the ACE-enabled units, according to the observed behaviors and requirements.

According to another view an RU included in a microprocessor may be dynamically reconfigured over time to execute portions of a predetermined instruction set and to execute an alternate instruction set. Infrequently used instructions of the predetermined instruction set may be supported by the RU instead of by dedicated circuitry, thus reducing cost and power consumption. Frequently used instructions of the predetermined instruction set may be supported in an optimized manner by dynamically reconfiguring the RU, thus improving performance and/or reducing power usage. The alternate instruction set may be supported partially or entirely via dynamic reconfiguration of the RU instead of by additional circuitry, thus improving cost, performance, and computational energy requirements. The RU may be used in conventional microprocessors in addition to adaptive computing ensemble microprocessors that include a plurality of flexible computation units (such as an RU) dynamically allocated to computing ensembles having threads assigned thereto.

According to another view a microprocessor constructed according to a statically configured multi-core microarchitecture may be configured during manufacturing or system set-up to implement various combinations of functional and non-functional objectives. The functional objectives may include an ability to execute a selected class of instructions (such as floating-point instructions) on a subset of processing cores configured from a multi-core device while other configured processing cores lack the ability to execute the selected class of instructions. The non-functional objectives may include a first processing core configured to operate at a relatively high-level of performance in combination with a second processing core configured to operate at a relatively low-level of energy consumption. The static configuring may be directed to map out defective elements of a multi-core device as defect-free elements are configured into a plurality of processing cores. Configured processing cores may be symmetric or asymmetric according to various implementation requirements. Thread migration circuitry included in devices according to the multi-core microarchitecture enables stopping execution of a thread on one processing core and restarting execution of the thread on another processing core.

According to another view a configurable multi-core processor implements a dynamically configurable set of processing cores each having a front-end circuit coupled to one or more execution circuits (such as integer, floating-point, segmentation, and reconfigurable execution circuits). The processing cores may be reconfigured according to changing functional and non-functional requirements. Functional requirements may change due to instruction-specific processing needs, such as encountering a floating-point instruction while executing via a processing core lacking a floating-point unit. In response the processing core may be reconfigured to include a floating-point unit. The floating-point unit may be dedicated to the processing core or shared via multi-threaded use of a floating-point execution circuit. Instead of reconfiguring the processing core, the thread may be migrated to another processing core that includes a floating-point circuit. Non-functional requirements may change in response to an event, such as removal (or addition) of wall power, leading to a request to execute a thread at a lower power-usage (or a higher performance) level. A corresponding processing core may be reconfigured in response, such as by operating at a lower (or higher) frequency.

According to another view a virtual processor is reconfigured in preparation for migration of execution of a thread to the virtual processor. The migration may be triggered by an event, and the reconfiguration may be based in part on the event or information relating to the event. The event may include thread activation/deactivation, an operating environment change, and a request relating to power/performance. The operating environment change may include changes in ambient or sensed temperature, as well as power source changes (such as battery versus wall power). The reconfiguration may include reconfiguring one or more front-end or execution units associated with (or allocated to) the virtual processor, such as enabling/disabling a multi-thread mode, enabling/disabling one or more sub-units, or altering sizes of storage arrays. The reconfiguration may include assigning additional execution resources to (or removing execution resources from) the virtual processor. The reconfiguration may include altering an operating context parameter, such as changing operating frequency or voltage.

FIG. 1 illustrates selected details of an embodiment of a processor organization including logical (and in some embodiments, physical) units FEU 101, ICU 102, FPU 103, and MU 104. The FEU implements instruction fetch and decode, the ICU integer instruction computation, the FPU FP instruction computation, and the MU memory access. The ICU also provides various pipeline control functions.

Figure 2:
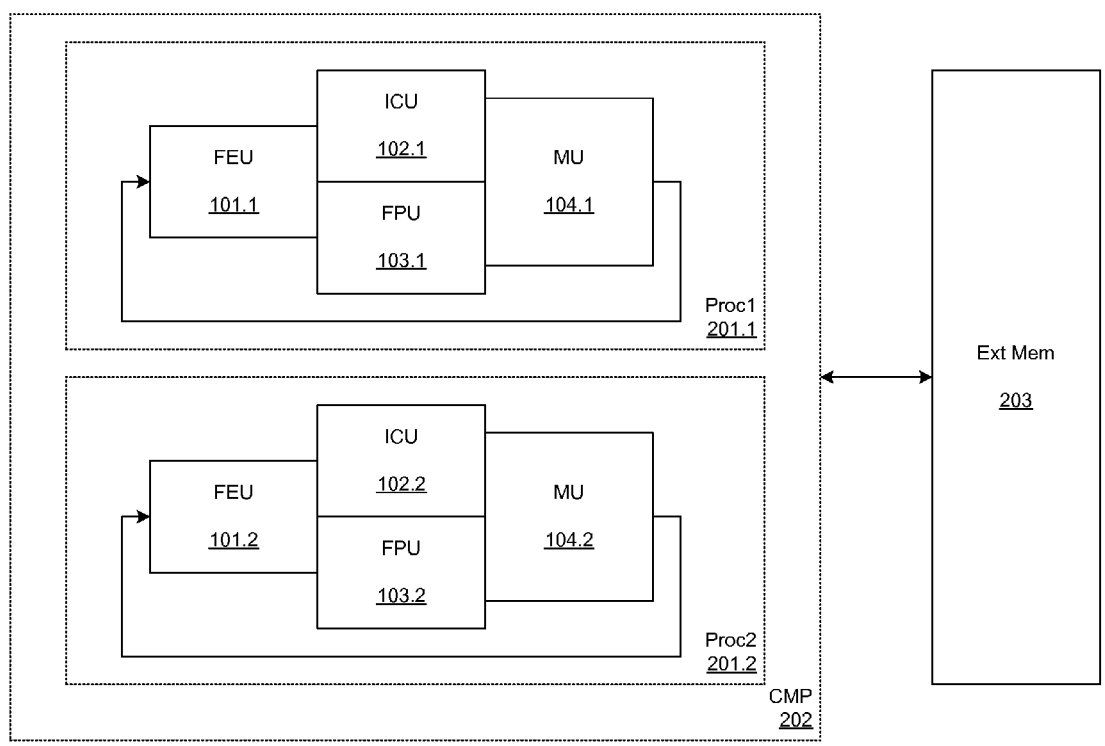
FIG. 2 illustrates selected details of an example embodiment of a CMP organization including multiple processors (each with an FEU, an ICU, an FPU, and an MU) with a common path to external memory.

FIG. 2 illustrates selected details of an example embodiment of CMP 202 including multiple processors Proc1 201.1 and Proc2 201.2 (each with respective FEUs 101.1 and 101.2, ICUs 102.1 and 102.2, FPUs 103.1 and 103.2, along with MUs 104.1 and 104.2) having a common path to External Memory 203. As illustrated, the CMP is assembled from replicated processors having no common resources except the path to external memory. In some embodiments (not illustrated) the processors may share other resources, such as an FPU or cache memory.

An ACE architecture or organization implements a novel arrangement of flexible computing resources, combining elements of SMT and CMP, thus enabling dynamic assignment of computational capabilities to a plurality of threads as provided by a processor implementation. An ACE embodiment may include an arbitrary number of ACE-enabled computational resources, such as FEUs, ICUs, SUs, FPUs, and RUs having either symmetric or asymmetric characteristics (for homogenous and heterogeneous systems, respectively), according to various implementations. The resources and associated characteristics are described in more detail elsewhere herein with respect to various embodiments and usage scenarios. An interconnection network enables communication between ACE-enabled FEUs and various execution units such as ACE-enabled ICUs and FPUs. An MCU controls the interconnection network, as well as other characteristics of the computing resources and interactions between the resources. The MCU may be directed by system firmware included in a BIOS image stored in a ROM or a hard disk. The ACE-enabled RU may be dynamically configured as an ICU or SU, or may be dynamically configured to perform functions in place of a fixed-function hardware unit such as a hardware accelerator or a legacy peripheral.

Illustrative Combinations

This introduction concludes with a collection of paragraphs that tersely summarize illustrative systems and methods in accordance with the concepts taught herein. Each of the paragraphs highlights various combinations of features using an informal pseudo-claim format. These compressed descriptions are not meant to be mutually exclusive, exhaustive, or restrictive and the invention is not limited to these highlighted combinations. As is discussed in more detail in the Conclusion section, the invention encompasses all possible modifications and variations within the scope of the issued claims, which are appended to the very end of the patent.

A first illustrative combination, being a computing device for use with an external memory, the computing device including computing resources including at least one FEU and at least one EU; an interconnection network enabling each FEU to selectively communicate with each EU; an MCU controlling the interconnection network; a memory unit providing access to the external memory for each FEU and each EU; and wherein for each of a plurality of active thread processed by the computing device, the MCU allocates a respective subset of the computing resources to form a virtual processor and assigns the respective active thread to the respective virtual processor for execution.

A computing device as in the first illustrative combination, further wherein at least two of the active threads are simultaneously active for a portion of time. A computing device as in the first illustrative combination, further wherein at least some of the time a plurality of the virtual processors execute a plurality of the active threads.

A computing device as in the first illustrative combination, wherein the at least one of the EUs includes at least one IU. A computing device as in the first illustrative combination, wherein the at least of the EUs includes at least one ICU. A computing device as in the first illustrative combination, wherein the at least of the EUs includes at least one FPU. A computing device as in the first illustrative combination, wherein the at least of the EUs includes at least one ICU and at least one FPU.

A computing device as in the first illustrative combination, wherein the at least one EU is a first EU and further including a second EU and a third EU. The foregoing illustrative combination wherein at least two of the EUs have identical characteristics and at least two of the EUs have unique characteristics. The foregoing illustrative combination wherein the characteristics are power/performance characteristics.

A computing device as in the first illustrative combination, wherein the interconnection network includes a crossbar. The foregoing illustrative combination wherein the crossbar is enabled to communicate instructions from the FEUs to the EUs. The foregoing illustrative combination wherein the crossbar is enabled to communicate at least one result of at least one of the instructions from at least one of the EUs to at least one of the FEUs. The foregoing illustrative combination wherein the at least one result includes a branch prediction outcome.

A second illustrative combination, being a computing device as in the first illustrative combination, wherein the computing resources further include at least another EU. A computing device as in the second illustrative combination, wherein the at least one EU and the at least another EU have symmetric characteristics. The foregoing illustrative combination wherein the symmetric characteristics are power/performance characteristics. The foregoing illustrative combination wherein the power/performance characteristics are a function of at least one of voltage scaling, frequency scaling, back bias, multiple-Vt transistors, clock gating, power gating, and input vector control. The foregoing illustrative combination wherein the EUs are homogenous.

A computing device as in the second illustrative combination, wherein the at least one EU and the at least another EU have asymmetric characteristics. The foregoing illustrative combination wherein the asymmetric characteristics are power/performance characteristics. The foregoing illustrative combination wherein the power/performance characteristics are a function of at least one of voltage scaling, frequency scaling, back bias, multiple-Vt transistors, clock gating, power gating, and input vector control. The foregoing illustrative combination wherein the EUs are heterogeneous.

A third illustrative combination, being a computing device as in the first illustrative combination, wherein the at least one EU is a first EU and further including a second EU having at least one power/performance characteristic different than the first EU. A computing device as in the third illustrative combination, wherein the second EU is implemented to have higher peak performance than the first EU. The foregoing illustrative combination wherein the second EU uses at least one of the following techniques in part to implement the higher peak performance: multiple-Vt devices, a relatively long pipeline, and a relatively wide pipeline. A computing device as in the third illustrative combination, wherein the first EU is implemented to have lower maximum power than the second EU. The foregoing illustrative combination wherein the first EU uses at least one of the following techniques in part to implement the lower maximum power: multiple-Vt devices, a relatively short pipeline, and a relatively narrow pipeline.

A fourth illustrative combination, being a computing device for use with an external memory, the computing device including computing resources including at least one FEU and at least one RU; an interconnection network enabling each FEU to selectively communicate with each RU; an MCU controlling the interconnection network; a memory unit providing access to the external memory for each FEU and each RU; and wherein for each of a plurality of active threads processed by the computing device, the MCU allocates a respective subset of the computing resources to form a virtual processor, assigns the respective active thread to the respective virtual processor for execution, and manages reconfiguration of the RU.

A computing device as in the fourth illustrative combination, wherein the management of the reconfiguration is dynamic.

A computing device as in the fourth illustrative combination, wherein the at least one RU is configurable to execute instructions of a predetermined instruction set. The foregoing illustrative combination wherein the RU is further configurable to execute a special operation that is representative of a sequence of at least two instructions of the predetermined instruction set. The foregoing illustrative combination wherein the predetermined instruction set is not enabled to directly represent the special operation.

A computing device as in the fourth illustrative combination, wherein the at least one RU is configurable according to at least a first and a second configuration. The foregoing illustrative combination wherein the first configuration corresponds to being configured to execute a first subset of instructions of a predetermined instruction set. The foregoing illustrative combination wherein the second configuration corresponds to being configured to execute a second subset of instructions of the predetermined instruction set and the second subset of instructions is distinct from the first subset of instructions. The foregoing illustrative combination wherein the first subset of instructions corresponds to instructions executable by an ICU. The foregoing illustrative combination wherein the second subset of instructions corresponds to instructions executable by an SU.

A computing device as in the fourth illustrative combination, wherein the at least one RU is configurable according to at least a first and a second configuration and the first configuration corresponds to being configured to execute at least one special function. The foregoing illustrative combination wherein the second configuration corresponds to being configured to execute at least one ordinary function. The foregoing illustrative combination wherein the at least one special function is a complex addressing-mode function. The foregoing illustrative combination wherein the complex addressing-mode function includes segmentation. The foregoing illustrative combination wherein the ordinary function includes at least one of an integer logical function and an integer arithmetic function.

A computing device as in the fourth illustrative combination, wherein the at least one RU is configurable according to at least a first and a second performance configuration. The foregoing illustrative combination wherein the first performance configuration enables higher performance than the second performance configuration. The foregoing illustrative combination wherein the second performance configuration uses less power than the first performance configuration.

A computing device as in the fourth illustrative combination, wherein the at least one RU is configurable according to at least a first and a second power-consumption configuration. The foregoing illustrative combination wherein the first power-consumption configuration enables lower power-consumption than the second power-consumption configuration. The foregoing illustrative combination wherein the second power-consumption configuration provides more performance than the first power-consumption configuration.

A computing device as in the fourth illustrative combination, wherein the FEU is enabled to process instructions of a predetermined instruction set and the RU is configurable to execute instructions of an alternate instruction set. The foregoing illustrative combination wherein the instructions of the alternate instruction set are not present in the predetermined instruction set. The foregoing illustrative combination wherein instructions of the alternate instruction set are fetched from at least one of memory external to the RU, and memory internal to the RU. The foregoing illustrative combination wherein the memory external to the RU includes at least one of a trace cache, a first-level instruction cache, a second-level cache, and main memory. The foregoing illustrative combination wherein the memory internal to the RU includes a ROM.

A computing device as in the fourth illustrative combination, wherein the RU is configurable to execute instructions. The foregoing illustrative combination wherein the RU includes registers. The foregoing illustrative combination wherein at least a portion of the registers are configurable to hold architectural state referred to by at least a portion of the instructions. The foregoing illustrative combination wherein the RU includes a datapath. The foregoing illustrative combination wherein the datapath is configurable to perform at least a portion of operations specified by the portion of the instructions.

A computing device as in the fourth illustrative combination, wherein the RU is configurable to execute memory reference instructions. The foregoing illustrative combination wherein the RU is further configurable to access memory during the execution of the memory reference instructions. The foregoing illustrative combination wherein the memory access is optimized. The foregoing illustrative combination wherein the optimized memory access includes at least one of bypassing a first-level cache, and bypassing a second-level cache.

A computing device as in the fourth illustrative combination, wherein the RU is configurable to operate as a state machine. The foregoing illustrative combination wherein the RU includes registers. The foregoing illustrative combination wherein at least a portion of the registers are configurable to hold state accessed by the state machine. The foregoing illustrative combination wherein the RU includes a datapath. The foregoing illustrative combination wherein the datapath is configurable to perform operations on behalf of the state machine.

A computing device as in the fourth illustrative combination, wherein the RU is configurable to provide functions equivalent to any portion of a hardware accelerator.

A computing device as in the fourth illustrative combination, wherein the RU is configurable to provide functions equivalent to any portion of a legacy peripheral.

A computing device as in the fourth illustrative combination, wherein the RU is configurable according to a plurality of configurations, the configurations including at least one of an instruction execution configuration and a fixed-function configuration. The foregoing illustrative combination wherein the instruction execution configuration includes at least one of a predetermined instruction configuration and an alternate instruction configuration. The foregoing illustrative combination wherein the fixed-function configuration includes at least one of a hardware-accelerator function and a legacy peripheral function. The foregoing illustrative combination wherein the MCU directs dynamic reconfiguration of the RU from a first of the configurations to a second of the configurations. The foregoing illustrative combination herein the dynamic reconfiguration is in response to changing system requirements. The foregoing illustrative combination wherein the system requirements include at least one of a thermal requirement, an energy use requirement, and a performance requirement.

A computing device as in the fourth illustrative combination, wherein at least two of the active threads are simultaneously active for a portion of time. A computing device as in the fourth illustrative combination, further wherein at least some of the time a plurality of the virtual processors execute a plurality of the active threads.

A computing device as in the fourth illustrative combination, wherein the at least one of the RUs is configurable to operate as at least one IU. A computing device as in the fourth illustrative combination, wherein the at least one of the RUs is configurable to operate as at least one ICU. A computing device as in the fourth illustrative combination, wherein the at least one of the RUs is configurable to operate as at least one FPU. A computing device as in the fourth illustrative combination, wherein the at least one of the RUs is configurable to operate as at least one ICU and at least one FPU. A computing device as in the fourth illustrative combination, wherein the at least one of the RUs is configurable to operate as at least one SU.

A computing device as in the fourth illustrative combination, wherein the at least one RU is a first RU and further including a second RU and a third RU. The foregoing illustrative combination wherein at least two of the RUs have identical characteristics and at least two of the RUs have unique characteristics. The foregoing illustrative combination wherein the characteristics are power/performance characteristics.

A computing device as in the fourth illustrative combination, wherein the interconnection network includes a crossbar. The foregoing illustrative combination wherein the crossbar is enabled to communicate instructions from the FEUs to the RUs. The foregoing illustrative combination wherein the crossbar is enabled to communicate at least one result of at least one of the instructions from at least one of the RUs to at least one of the FEUs. The foregoing illustrative combination wherein the at least one result includes a branch prediction outcome.

A fifth illustrative combination, being a computing device as in the fourth illustrative combination, wherein the computing resources further include at least another RU. A computing device as in the fifth illustrative combination, wherein the at least one RU and the at least another RU have symmetric characteristics. The foregoing illustrative combination wherein the symmetric characteristics are power/performance characteristics. The foregoing illustrative combination wherein the power/performance characteristics are a function of at least one of voltage scaling, frequency scaling, back bias, multiple-Vt transistors, clock gating, power gating, and input vector control. The foregoing illustrative combination wherein the RUs are homogenous.

A computing device as in the fifth illustrative combination, wherein the at least one RU and the at least another RU have asymmetric characteristics. The foregoing illustrative combination wherein the asymmetric characteristics are power/performance characteristics. The foregoing illustrative combination wherein the power/performance characteristics are a function of at least one of voltage scaling, frequency scaling, back bias, multiple-Vt transistors, clock gating, power gating, and input vector control. The foregoing illustrative combination wherein the RUs are heterogeneous.

A sixth illustrative combination, being a computing device as in the fourth illustrative combination, wherein the at least one RU is a first RU and further including a second RU having at least one power/performance characteristic different than the first RU.

A computing device as in the sixth illustrative combination, wherein the second RU is implemented to have higher peak performance than the first RU. The foregoing illustrative combination wherein the second RU uses at least one of the following techniques in part to implement the higher peak performance: multiple-Vt devices, a relatively long pipeline, and a relatively wide pipeline. A computing device as in the sixth illustrative combination, wherein the first RU is implemented to have lower maximum power than the second RU. The foregoing illustrative combination wherein the first RU uses at least one of the following techniques in part to implement the lower maximum power: multiple-Vt devices, a relatively short pipeline, and a relatively narrow pipeline.

A computing device as in the sixth illustrative combination, wherein the second RU is configurable to have higher peak performance than the first RU. The foregoing illustrative combination wherein the second RU uses at least one of the following techniques in part to implement the higher peak performance: a relatively long pipeline and a relatively wide pipeline. A computing device as in the sixth illustrative combination, wherein the first RU is configurable to have lower maximum power than the second RU. The foregoing illustrative combination wherein the first RU uses at least one of the following techniques in part to implement the lower maximum power: a relatively short pipeline and a relatively narrow pipeline.

A computing device as in any of the foregoing illustrative combinations, further wherein at least one of the active threads is assigned to a single set of resources. The foregoing illustrative combination wherein at least one of the other active threads is assigned to two sets of resources. The foregoing illustrative combination wherein the single set of resources and the two sets of resources are distinct. The foregoing illustrative combination wherein each of two new active threads may be assigned to a respective one of the two sets of resources when the at least one other active threads becomes inactive.

A computing device as in any of the foregoing illustrative combinations, further wherein a first one of the virtual processors formed from the respective first subset of the computing resources includes unduplicated resources. The foregoing illustrative combination wherein the unduplicated resources are allocated to the first virtual processor. The foregoing illustrative combination wherein a first one of the active threads is assigned to be executed by the first virtual processor. The foregoing illustrative combination wherein a second one of the virtual processors formed from the respective second subset of the computing resources includes at least one duplicated resource. The foregoing illustrative combination wherein the duplicated resource includes a first resource instance and a second resource instance. The foregoing illustrative combination wherein the resource instances are allocated to the second virtual processor. The foregoing illustrative combination wherein a second one of the active threads is assigned to be executed by the second virtual processor. The foregoing illustrative combination wherein when the second active thread becomes inactive, the first resource instance is allocated to a first new virtual processor and the second resource instance is allocated to a second new virtual processor. The foregoing illustrative combination wherein a first new active thread is assigned to be executed by the first new virtual processor. The foregoing illustrative combination wherein a second new active thread is assigned to be executed by the second new virtual processor. The foregoing illustrative combination wherein the resource instances have identical power/performance characteristics.

A computing device as in any of the foregoing illustrative combinations, further including at least one of the following hardware function units: a front-end decode unit, a microcode unit, a TC, a second-level TLB, an L2$, an MMX unit, a SIMD unit, an SSE unit, and an SU. The foregoing illustrative combination wherein the included hardware function unit is a shared hardware function unit. The foregoing illustrative combination further including a shared FPU. The foregoing illustrative combination wherein the hardware function unit is included in the computing resources.

A computing device as in any of the foregoing illustrative combinations, further including an ICU. The foregoing illustrative combination wherein the ICU is included in the computing resources.

A computing device as in any of the foregoing illustrative combinations, wherein the MCU is coupled to the computing resources. A computing device as in any of the foregoing illustrative combinations, further wherein the MCU selectively makes use of a plurality of voltage scaling levels. The foregoing illustrative combination wherein the voltage scaling levels apply to at least a portion of the computing resources. The foregoing illustrative combination wherein performance available from the portion of the computing resources is a function of the voltage scaling levels. The foregoing illustrative combination wherein power consumed by the portion of the computing resources is a function of the voltage scaling levels.

A computing device as in any of the foregoing illustrative combinations, further wherein the MCU assigns at least some of the computing resources to at least one of the active threads statically. A computing device as in any of the foregoing illustrative combinations, further wherein the MCU assigns at least some of the computing resources to at least one of the virtual processors statically. A computing device as in any of the foregoing illustrative combinations, further wherein the MCU assigns at least some of the computing resources to at least one of the active threads dynamically. A computing device as in any of the foregoing illustrative combinations, further wherein the MCU assigns at least some of the computing resources to at least one of the virtual processors dynamically. A computing device as in any of the foregoing illustrative combinations, further wherein the MCU selectively assigns at least some of the computing resources to at least some of the active threads statically and dynamically in accordance with a predetermined criteria. A computing device as in any of the foregoing illustrative combinations, further wherein the MCU selectively assigns at least some of the computing resources to at least some of the virtual processors statically and dynamically in accordance with a predetermined criteria.

A computing device as in any of the foregoing illustrative combinations, further wherein at least some of the units implement clock gating.

A computing device as in any of the foregoing illustrative combinations, wherein the device implements a CE in accordance with ACE-organization techniques taught herein.

An ACE-organization microprocessor illustrative combination including any of the foregoing computing device illustrative combinations, wherein power is traded-off against performance through adjusting allocations of at least one of second-level cache entries, second-level TLB entries, and TC entries. The foregoing illustrative combination wherein the allocations include first and second allocations to respective elements of a group, the group being at least one of a group of virtual processors, and a group of threads.

An ACE-organization microprocessor illustrative combination including any of the foregoing computing device illustrative combinations, wherein power-management is based on selective application of at least one of the following techniques: voltage/frequency scaling, back bias, multiple-Vt transistors, clock gating, power gating, and input vector control.

An ACE-organization microprocessor illustrative combination including any of the foregoing computing device illustrative combinations, wherein performance-management is based on selective application of at least one of the following techniques: voltage/frequency scaling, back bias, multiple-Vt transistors, clock gating, power gating, and input vector control.

A seventh illustrative combination, being a method including the steps of optimizing a trace for execution by a microprocessor implemented in accordance with an ACE organization. The foregoing illustrative combination wherein the trace optimizing includes at least one of a static technique and a dynamic technique. The foregoing illustrative combination wherein the microprocessor includes the computing device of the first illustrative combination.

A method as in any of the foregoing illustrative combinations having a step of optimizing a trace, wherein the trace optimizing is at least one of hardware based, software based, and a combination of hardware and software based.

A method as in any of the foregoing illustrative combinations, wherein one processor optimizes a trace for another processor. The foregoing illustrative combination wherein the optimizing is performed as background processing.

An eighth illustrative combination, being a method including the steps of dynamically reassigning an active thread from a first virtual processor having a first power-performance characteristic to a second virtual processor having a second power-performance characteristic. The foregoing illustrative combination wherein the dynamically reassigning is to improve at least one of a power dissipation metric, a temperature metric, a performance metric, and a power-performance metric. The foregoing illustrative combination wherein the dynamically reassigning is in accordance with a predetermined criteria relating to at least one of the metrics. The foregoing illustrative combination further including determining the at least one of the metrics.

A ninth illustrative combination, being a method including the steps of allocating first and second sets of resources respectively to first and second threads; and executing the threads on the sets of resources according to the allocating. The foregoing illustrative combination wherein at least one resource in the sets of resources is enabled to simultaneously execute at least two threads.

A method as in the ninth illustrative combination wherein at least one unit in at least one of the sets of resources is selectively operable in a single-thread mode and a multi-thread mode. The foregoing illustrative combination wherein the single-thread mode dedicates all of the one unit to processing of a single thread, and the multi-thread mode dedicates first and second portions of the one unit to processing of respective first and second threads.

A method as in the ninth illustrative combination and further including reallocating the resources according to an observed metric. The foregoing illustrative combination wherein the observed metric includes at least one of available battery energy, temperature, cache performance, available spare processing cycles, superscalar instruction issue success, speculative processing success, and out-of-order processing success. The foregoing illustrative combination wherein the superscalar instruction issue success includes a relative measure of unused issue bandwidth, the speculative processing success includes a relative measure of at least one of branch prediction and load value prediction correctness, and the out-of-order processing success includes a relative measure of a reduced worst-path execution-cost.

A method as in the ninth illustrative combination and further including assigning the resources according to a requirement. The foregoing illustrative combination further including reassigning the resources in response to a change in the requirement. The foregoing illustrative combination wherein the requirement is at least one of a performance requirement, a heat dissipation requirement, a temperature requirement, and a power consumption requirement. The foregoing illustrative combination wherein each of the sets of resources operates as a respective virtual processor.

A tenth illustrative combination, being a method including the steps of assigning first and second groups of flexible computing elements respectively to first and second CEs; and executing first and second threads respectively on the first and the second CEs. The foregoing illustrative combination wherein at least one unit in at least one of the flexible computing elements is capable of executing at least two threads in parallel. The foregoing illustrative combination wherein the at least one unit is operable in a single-thread mode and a multi-thread mode. The foregoing illustrative combination wherein the single-thread mode dedicates all of the unit to processing of a single thread, and the multi-thread mode dedicates first and second portions of the unit to processing of respective first and second threads.

A method as in the tenth illustrative combination and further including reassigning the flexible computing elements according to a measured parameter. The foregoing illustrative combination wherein the measured parameter includes at least one of stored energy, temperature, cache benefit, unused processor cycles, superscalar benefit, speculation benefit, and out-of-order benefit. The foregoing illustrative combination wherein the stored energy is in a battery, the superscalar benefit is with respect to available ILP, the speculation benefit is with respect to at least one of branch and load value mispredictions, and the out-of-order benefit is with respect to cycles to complete a workload.

A method as in the tenth illustrative combination and further including allocating the flexible computing elements according to an objective. The foregoing illustrative combination further including reallocating the flexible computing elements according to a change in the objective. The foregoing illustrative combination wherein the objective includes at least one of a performance objective, a power dissipation objective, a temperature objective, and a power consumption objective. The foregoing illustrative combination wherein each of the groups of flexible computing elements operates as a respective virtual processor.

An eleventh illustrative combination, being a method including the steps of assigning a first set of resources to a first thread according to a first requirement, assigning a second set of resources to a second thread according to a second requirement, and executing the threads on the sets of resources according to the assigning. The foregoing illustrative combination wherein at least one of the resources includes a unit selectively operable in a single-thread mode and a multi-thread mode. The foregoing illustrative combination wherein the single-thread mode dedicates all of the unit to processing of a single thread, and the multi-thread mode dedicates first and second portions of the unit to processing of respective first and second threads.

A method as in the eleventh illustrative combination wherein at least one of the requirements is at least one of a performance requirement, a power dissipation requirement, a temperature requirement, and a power consumption requirement. The foregoing illustrative combination further including allocating the resources according to a measured behavior. The foregoing illustrative combination further including reallocating the resources according to a change in the measured behavior. The foregoing illustrative combination wherein the measured behavior includes at least one of power use, heat generation, and resource utilization. The foregoing illustrative combination wherein the resource utilization includes cache system usage, superscalar issue slot usage, speculation mechanism usage, and out-of-order window usage. The foregoing illustrative combination wherein the speculation mechanism usage is related to at least one of branch prediction accuracy and load value prediction accuracy.

A twelfth illustrative combination, being a method including the steps of associating a first set of resources to a first virtual processor in accordance with a first specification; associating a second set of resources to a second virtual processor in accordance with a second specification; and executing first and second threads respectively on the first and the second virtual processors. The foregoing illustrative combination wherein at least one of the virtual processors includes a multi-mode execution unit configurable for operation in a single-thread mode and a multi-thread mode. The foregoing illustrative combination wherein the single-thread mode dedicates all of the unit to processing of a single thread, and the multi-thread mode dedicates first and second portions of the unit to processing of respective first and second threads.

A method as in the twelfth illustrative combination wherein at least one of the specifications is at least one of a minimum performance specification, a maximum power dissipation specification, a maximum power consumption specification, and a minimum stored-energy operational period specification.

A method as in the twelfth illustrative combination further including allocating the resources according to a measured behavior. The foregoing illustrative combination further including reallocating the resources according to a change in the measured behavior. The foregoing illustrative combination wherein the specification behavior includes at least one of power use, heat generation, temperature, and resource utilization. The foregoing illustrative combination wherein the resource utilization includes at least one of cache usage, superscalar issue slot usage, speculation mechanism usage, and out-of-order window usage. The foregoing illustrative combination wherein the speculation mechanism usage is related to at least one of branch prediction accuracy and load value prediction accuracy. The foregoing illustrative combination further including assigning the first and the second threads respectively to the first and the second virtual processors.

A thirteenth illustrative combination, being a method including the steps of suspending execution of a thread on a first resource; after the suspending, scaling an operating parameter of the first resource; after the scaling, leaving the first resource idle until clocks in the first resource are stable; after the clocks are stable, resuming the execution of the thread on the first resource; and during at least a portion of time when the first resource is idle, continuing the execution of the thread on a second resource. The foregoing illustrative combination wherein the parameter is at least one of a supply voltage and a clock frequency. The foregoing illustrative combination wherein the resources each include at least one ICU. The foregoing illustrative combination wherein the scaling is under control of an MCU.

A fourteenth illustrative combination, being a method including the steps of fetching an instruction specifying an operation; and if the instruction is an instruction of an alternate instruction set, then configuring a reconfigurable unit to execute the operation. The foregoing illustrative combination further including if the instruction is an instruction of an alternate instruction set, then after the configuring, issuing the operation to the reconfigurable unit. The foregoing illustrative combination further including if the instruction is an instruction of a predetermined instruction set, then issuing the instruction to a non-reconfigurable unit. The foregoing illustrative combination further including after fetching the instruction, fetching another instruction specifying another operation; and if the other instruction is an instruction of the alternate instruction set, then optionally reconfiguring the reconfigurable execution unit to execute the other operation. The foregoing illustrative combination wherein if the operation and the other operation are identical, then the reconfiguring is omitted and otherwise the reconfiguring is performed.

The foregoing illustrative combination wherein the operation is to perform a function associated with at least one of a hardware accelerator and a legacy peripheral. The foregoing illustrative combination wherein the non-reconfigurable unit includes at least one of an IU, an ICU, an FPU, an SU, and an SPU. The foregoing illustrative combination wherein the units are included in a microprocessor.

An fifteenth illustrative combination, being a computer-readable medium having a set of instructions stored therein which when executed by a processing element causes the processing element to perform steps according to any of the foregoing methods.

A sixteenth illustrative combination, being a computer-readable medium having a set of instructions stored therein which when executed by a processing element causes the processing element to perform steps including allocating first and second sets of resources respectively to first and second virtual processors; and assigning first and second threads respectively to the first and the second virtual processors. The foregoing illustrative combination further including in response to recognition of an event, reallocating at least a portion of the resources from at least one of the first and the second virtual processors to a third virtual processor. The foregoing illustrative combination further including assigning a third thread to the third virtual processor. The foregoing illustrative combination wherein the event includes at least one of activation of the third thread, and deactivation of the first thread. The foregoing illustrative combination wherein the event is indicated in a register accessible to the processing element.

A computer-readable medium as in the sixteenth illustrative combination and wherein at least one of the resources is enabled to process at least two threads. The foregoing illustrative combination wherein at least two of the resources are enabled to process at least two threads each. The foregoing illustrative combination wherein at least one of the resources is operable in a plurality of modes, the modes including at least two of a high performance mode, a low performance mode, and a low power mode. The foregoing illustrative combination wherein the high performance mode is characterized by at least one of a larger cache, a greater degree of parallel processing, a longer pipeline depth, a higher frequency of operation, a higher operating voltage, and a lower back-bias voltage, than at least one of the low performance mode and the low power mode. The foregoing illustrative combination further including switching the at least one resource from operation in a first one of the modes to operation in a second one of the modes. The foregoing illustrative combination wherein the switching is in response to detection of at least one of a low energy condition, a low battery condition, a high temperature condition, an insufficient performance condition, and a scheduling deadline condition.

A seventeenth illustrative combination, being a computer-readable medium having a set of instructions stored therein which when executed by a processing element causes the processing element to perform steps including arranging to execute a first thread on a first set of execution units from a pool of execution units; and arranging to execute a second thread on a second set of execution units from the pool of execution units. The foregoing illustrative combination wherein at least one element of the first set of execution units is included in the second set of execution units. The foregoing illustrative combination wherein the at least one element is enabled to execute two threads in parallel.

A computer-readable medium as in the seventeenth illustrative combination and wherein the execution units include an integer execution unit. A computer-readable medium as in the seventeenth illustrative combination and wherein the execution units include a floating-point execution unit. A computer-readable medium as in the seventeenth illustrative combination and wherein the execution units include a segmentation execution unit. A computer-readable medium as in the seventeenth illustrative combination and wherein the execution units include a reconfigurable execution unit. A computer-readable medium as in the seventeenth illustrative combination and wherein the execution units include a special-purpose execution unit. The foregoing illustrative combination wherein the special-purpose execution unit is enabled to process instructions optimized to perform of at least one of digital media processing, network packet processing, and speech recognition processing.

A computer-readable medium as in the seventeenth illustrative combination and further including arranging to execute a third thread on a third set of execution units from the pool of execution units in response to activation of the third thread. The foregoing illustrative combination wherein the third set of execution units includes at least a portion of one of the execution units of the first set of execution units. The foregoing illustrative combination wherein if a specific one of the first set of execution units is unused by the first thread for a period of time, then a new thread is arranged to execute at least in part using the specific one of the first set of execution units. The foregoing illustrative combination wherein the period of time is at least one of a configurable period of time, and a predetermined period of time. The foregoing illustrative combination wherein the configurable period of time is specified by a programmable register.

An eighteenth illustrative combination of a system including a reconfigurable execution unit configurable to operate in a plurality of configurations; a supplementary execution unit; a controller coupled to the units; and wherein the controller is enabled to direct configuring of the reconfigurable execution unit according to one of the configurations.

The eighteenth illustrative combination further including an instruction fetch and decode unit selectively coupled to the execution units by an operation router. The foregoing illustrative combination wherein the fetch and decode unit is enabled to translate variable-length macro instructions into fixed-length operations to be processed by the execution units. The eighteenth illustrative combination wherein the controller is further enabled to dynamically assign each one of a plurality of threads to respective collections of the execution units. The foregoing illustrative combination wherein the controller is further enabled to control the selective coupling of the operation router according to the assignments. The foregoing illustrative combination wherein each of the collections corresponds to a respective computing ensemble.

The eighteenth illustrative combination further including an instruction fetch and decode unit that is enabled to translate variable-length macro instructions into operations to be processed by the execution units. The foregoing illustrative combination wherein the variable-length macro instructions are byte-granular. The foregoing illustrative combination wherein the operations are fixed-length. The eighteenth illustrative combination further including an instruction fetch and decode unit that is enabled to translate variable-length macro instructions into variable-length operations to be processed by the execution units. The foregoing illustrative combination wherein the variable-length operations include operations of first and second predetermined lengths that are compatible with processing by respective first and second ones of the execution units.

The eighteenth illustrative combination wherein the supplementary execution unit is at least one of an integer execution unit, a floating-point execution unit, a segmented addressing execution unit, a memory interface unit, another reconfigurable execution unit, and a special purpose execution unit. The foregoing illustrative combination wherein the supplementary execution unit is operable to process more than one thread. The foregoing illustrative combination wherein at least one of the configurations is compatible with processing according to the supplementary execution unit.

The eighteenth illustrative combination wherein the one of the configurations is selected based at least in part on past behavior of a thread. The foregoing illustrative combination wherein the past behavior includes instructions executed.

A nineteenth illustrative combination of a method including configuring a reconfigurable unit to execute operations of a first type; in response to an event, reconfiguring the reconfigurable unit to execute operations of a second type.

The foregoing illustrative combination further including allocating the reconfigurable unit to at least one of a plurality of computing ensembles. The foregoing illustrative combination further including assigning each of a plurality of threads to a respective one of the computing ensembles. The foregoing illustrative combination further including allocating a supplementary unit to the at least one of the computing ensembles. The foregoing illustrative combination further including translating variable-length macro instructions into operations to be processed by the units. The foregoing illustrative combination wherein the supplementary unit is at least one of an integer unit, a floating-point unit, a complex-addressing unit, a special-purpose unit, and another reconfigurable unit. The foregoing illustrative combination wherein at least one of the units is enabled to process more than one thread.

The nineteenth illustrative combination wherein the event includes at least one of thread activation and thread deactivation. The nineteenth illustrative combination wherein the event is determined by translation of a variable-length macro instruction into an operation to be processed by the reconfigurable unit. The foregoing illustrative combination wherein the variable-length macro instruction specifies a complex-addressing operation. The foregoing illustrative combination wherein the complex-addressing operation includes a segmentation operation.

The nineteenth illustrative combination further including in response to another event, reconfiguring the reconfigurable unit to execute operations of a third type. The foregoing illustrative combination wherein the first type includes integer logical and integer arithmetical operations. The foregoing illustrative combination wherein the second type includes complex-addressing operations. The foregoing illustrative combination wherein the third type includes fixed-function operations. The foregoing illustrative combination wherein the fixed-function operations include operations to provide functions according to at least one of a legacy peripheral and a hardware accelerator.

A twentieth illustrative combination of a system including at least one front-end circuit enabled to simultaneously process at least two threads; at least two execution circuits; and wherein the at least one front-end circuit is statically configurable during manufacturing to selectively map out defective circuitry and to provide operations to the execution circuits.

A twenty-first illustrative combination of a system including at least one front-end circuit enabled to function simultaneously according to at least two threads; at least two execution circuits each coupled to receive operations from the at least one front-end circuit; defective circuitry; and wherein the at least one front-end circuit is statically configurable during manufacturing to operate according to at least two virtual processors. The foregoing illustrative combination wherein the virtual processors exclude the defective circuitry and include the execution circuits.

A twenty-second illustrative combination of a system including at least one front-end circuit enabled to simultaneously provide operations according to at least two threads; at least three execution circuits; and wherein at least one of the execution circuits is determined to have defective circuitry, the at least one front-end circuit is statically configurable to operate according to at least two virtual processors to provide the operations to the execution circuits, and the defective circuitry is excluded from all of the virtual processors.

Any of the twenty-first through twenty-second illustrative combinations further including thread-migration circuitry to enable thread migration between the virtual processors. The foregoing illustrative combination wherein the thread migration is in response to an event. The foregoing illustrative combination wherein the event includes at least one of a thread activation; a thread deactivation; a high-temperature detection; a low-temperature detection; a low-power detection; a switching to battery-power; a switching from battery-power; a switching to wall-power; a switching from wall-power; a request for high-performance operation; and a request for long-duration operation.

A twenty-third illustrative combination of a system including at least one front-end circuit enabled to simultaneously process at least two threads; at least two execution circuits; and wherein the at least one front-end circuit is statically configurable during system set-up to selectively provide operations to the execution circuits according to a system operational requirement. The foregoing illustrative combination wherein the system operational requirement includes at least one of a performance requirement and a power consumption requirement.

Any of the twentieth through twenty-third illustrative combinations wherein a first one of the execution circuits is symmetric with respect to a second one of the execution circuits. Any of the twentieth through twenty-third illustrative combinations wherein a first one of the execution circuits is asymmetric with respect to a second one of the execution circuits. Any of the twentieth through twenty-third illustrative combinations wherein one of the execution circuits is distinct with respect to others of the execution circuits.

Any of the twentieth through twenty-third illustrative combinations further including a memory circuit enabled to access memory on behalf of the other circuits. Any of the twentieth through twenty-third illustrative combinations further including a memory circuit enabled to access memory that is external to a microprocessor that includes the circuits. Any of the twentieth through twenty-third illustrative combinations further including a memory circuit enabled to access memory that is included in a microprocessor that also includes the circuits.

Any of the twentieth through twenty-third illustrative combinations wherein the operations are fixed-length. Any of the twentieth through twenty-third illustrative combinations wherein the operations are variable-length. The foregoing illustrative combination wherein the variable-length operations are bit-granular variable-length.

Any of the twentieth through twenty-third illustrative combinations wherein the at least one front-end circuit translates macro instructions to produce at least a portion of the operations. The foregoing illustrative combination wherein the macro instructions are variable-length. The foregoing illustrative combination wherein the variable-length macro instructions are byte-granular variable-length.

A twenty-fourth illustrative combination of a method including the steps of providing operations to at least two execution circuits dynamically according to a plurality of threads and statically according to configuration information; and wherein the configuration information is directed to form processors by selective mapping of portions of the circuits as included in the processors and remaining portions of the circuits as excluded from the processors.

The twenty-fourth illustrative combination wherein the portions of the circuits included in the processors are operational according to a manufacturing test. The twenty-fourth illustrative combination wherein at least some of the remaining portions of the circuits are non-operational according to a manufacturing test. The twenty-fourth illustrative combination wherein the configuration information specifies a number of the execution circuits to include in at least one of the processors. The twenty-fourth illustrative combination wherein the configuration information is retained in a non-volatile memory.

A twenty-fifth illustrative combination of a method including the steps of determining configuration information during manufacturing of a microprocessor; statically mapping out non-functional portions of the microprocessor according to the configuration information to form at least two processors from functional portions of the microprocessor; and wherein the functional portions of the microprocessor include a front-end circuit and at least two execution circuits.

A twenty-sixth illustrative combination of a microprocessor including a flexible computing ensemble having at least one front-end circuit and at least one execution circuit, and an interconnection circuit enabled to provide selective communication of operations from each front-end circuit to each execution circuit; a master control circuit coupled to the flexible computing ensemble to control the interconnection circuit and to configure, according at least one of a static technique and a dynamic technique, the front-end circuits and the execution circuits; and wherein the master control circuit is enabled to allocate subsets of the circuits of the flexible computing ensemble to form at least two respective virtual processors.

The twenty-sixth illustrative combination wherein the microprocessor is enabled to migrate threads between the virtual processors. The twenty-sixth illustrative combination wherein at least one of the virtual processors is formed in part according to a functional requirement.

A twenty-seventh illustrative combination of the twenty-sixth illustrative combination wherein the functional requirement includes processing of a class of instructions. The twenty-seventh illustrative combination wherein the class of instructions includes floating-point instructions. The twenty-seventh illustrative combination wherein the class of instructions includes special-purpose instructions. The twenty-seventh illustrative combination wherein the class of instructions includes SIMD instructions. The twenty-seventh illustrative combination wherein the class of instructions includes SSE instructions.

The twenty-sixth illustrative combination wherein at least one of the virtual processors is formed in part according to a non-functional requirement. the foregoing illustrative combination wherein the non-functional requirement is at least one of a thermal requirement, an energy consumption requirement, and a processing performance requirement.

A twenty-eighth illustrative combination of a method including the steps of configuring a computing resource to operate in a single-thread mode according to an initial functional requirement; and wherein the computing resource is allocated only to a single virtual processor.

A twenty-ninth illustrative combination of a method including the steps of configuring a computing resource to operate in a multiple-thread mode according to an initial functional requirement; and wherein the computing resource is simultaneously allocated to first and second virtual processors.

Any of the twenty-eighth and twenty-ninth illustrative combinations wherein the initial functional requirement includes execution of an initial class of operations compatible with the computing resource. the foregoing illustrative combination wherein the initial class of operations corresponds to at least one of a class of floating-point instructions, a class of special-purpose instructions, a class of SIMD instructions, and a class of SSE instructions.

Any of the twenty-eighth and twenty-ninth illustrative combinations further including reconfiguring the computing resource in response to a new functional requirement. the foregoing illustrative combination wherein the new functional requirement includes a requirement for execution of a new class of operations incompatible with the computing resource until after the reconfiguring.

A thirtieth illustrative combination of a method including the steps of configuring a computing resource to operate in a single-thread mode according to an initial thermal requirement; and wherein the computing resource is allocated only to a single virtual processor. the foregoing illustrative combination further including reconfiguring the computing resource in response to a new thermal requirement.

A thirty-first illustrative combination of a method including the steps of configuring a computing resource to operate in a multiple-thread mode according to an initial thermal requirement; and wherein the computing resource is simultaneously allocated to first and second virtual processors. the foregoing illustrative combination further including reconfiguring the computing resource in response to a new thermal requirement.

A thirty-second illustrative combination of a method including the steps of configuring a computing resource to operate in a single-thread mode according to an initial power-consumption constraint; and wherein the computing resource is allocated only to a single virtual processor. the foregoing illustrative combination further including reconfiguring the computing resource in response to a new power-consumption constraint.

A thirty-third illustrative combination of a method including the steps of configuring a computing resource to operate in a multiple-thread mode according to an initial power-consumption constraint; and wherein the computing resource is simultaneously allocated to first and second virtual processors. the foregoing illustrative combination further including reconfiguring the computing resource in response to a new power-consumption constraint.

A thirty-fourth illustrative combination of a method including the steps of configuring a computing resource to operate in a single-thread mode according to an initial performance requirement; and wherein the computing resource is allocated only to a single virtual processor. the foregoing illustrative combination further including reconfiguring the computing resource in response to a new performance requirement.

A thirty-fifth illustrative combination of a method including the steps of configuring a computing resource to operate in a multiple-thread mode according to an initial performance requirement; and wherein the computing resource is simultaneously allocated to first and second virtual processors. the foregoing illustrative combination further including reconfiguring the computing resource in response to a new performance requirement.

A thirty-sixth illustrative combination of a method including the steps of configuring a virtual processor; and in response to an event, migrating a thread to execute on the virtual processor after the configuring. the foregoing illustrative combination further including translating variable-length macro instructions into operations compatible with the virtual processor. the foregoing illustrative combination wherein the event includes at least one of detecting one of a predetermined set of operations among the operations; detecting one of a predetermined set of macro-instructions among the variable-length macro instructions; thread activation; thread deactivation; high-temperature detection; low-temperature detection; low-power detection; switching to battery-power; switching from battery-power; low battery life detection; low battery energy detection; switching to wall-power; switching from wall-power; requesting high-performance operation; and requesting long-duration operation.

The twenty-sixth illustrative combination wherein the configuring is in part to attain a power/performance objective. The twenty-sixth wherein the configuring is in response to the event.

Any of the foregoing illustrative combinations referring to defective circuitry wherein the defective circuitry is determined by a manufacturing test.

Any of the foregoing illustrative combinations referring to execution circuits wherein the execution circuits are selectively operable in at least a single-thread mode and a multiple-thread mode. Any of the foregoing illustrative combinations referring to execution circuits wherein the execution circuits include at least one of an integer execution circuit, an integer execution and control circuit, a floating-point execution circuit, a segmentation circuit, and a reconfigurable circuit.

Any of the foregoing illustrative combinations referring to a hardware accelerator, wherein the hardware accelerator is at least one of a TCP/IP offload engine, a cryptographic engine, a DES engine, and a RAS engine.

Any of the foregoing illustrative combinations referring to a legacy peripheral, wherein the legacy peripheral is at least one of a serial port, a floppy-disk drive, and a VGA display.

Adaptive Computing Ensemble (ACE) Overview

In the ACE organization, the MCU assigns each active thread to a specific collection of computing resources, such as three ACE-enabled units (an FEU, ICU, and FPU). Such a collection of resources forms a virtual processor, called a CE, to execute the thread. Resources may be assigned to a thread either statically or dynamically, for example in response to varying requirements and environmental conditions of performance, power, battery life, and temperature. Resource assignments may also be managed according to application characteristics, manufacturing test results, or configuration options that distinguish members of a product family based on a single physical implementation. The ACE architecture as taught herein supports dynamic resource assignment based on any of these requirements or conditions.

An ACE-enabled FEU performs functions of fetching instructions and decoding the instructions to identify the types of resources (such as an integer multiplier or an FP divider) required to complete execution. An FEU may fetch and decode multiple instructions of a thread in parallel, as in a superscalar architecture. Similarly, an FEU may retain context for multiple threads and operate on multiple threads simultaneously. An FEU may implement additional functions, such as cache memory or branch prediction, as is known by those of ordinary skill in the art.

An ACE-enabled ICU executes integer instructions. An ICU includes a register file to store context for one or more threads and logic to perform integer arithmetic, logical, shift and similar operations, as well as address calculations. An ICU may perform multiple operations in parallel for a single thread or multiple threads. Instructions may be executed in-order or out-of-order, using techniques known to those of ordinary skill in the art. An ICU may also include one or more data cache memories and TLBs. The registers, arithmetic and logical functions, and cache memory form a compact, tightly-coupled circuit for executing instructions whose latency has a relatively high impact on performance.

An ACE-enabled ICU controls instruction execution through the integer pipeline, and also provides global control for instructions of a CE. For example, an ICU controls sequencing of memory accesses, exceptions, and instruction completion for one or more threads throughout a CE.

An ACE-enabled FPU executes FP instructions, and may also be enabled for executing multi-media operations, such as MMX, SSE and other SIMD operations, in addition to other complex numeric calculations. An FPU includes a register file to store context for one or more threads, as well as logic to perform FP addition, subtraction, multiplication, division, conversion and similar operations. Instructions may be executed in-order or out-of-order, using techniques known to those of ordinary skill in the art. An FPU may perform multiple operations in parallel for a single thread or multiple threads.

An ACE-enabled MU is enabled for providing access to external memory by ACE-enabled FEUs, ICUs, and FPUs. External memory includes second- and third-level caches and DRAM portions of a memory system (i.e. elements aside from zero-level caches or TCs provided by FEUs and first-level caches optionally provided by the ICUs). The MU arbitrates between the units and one or more memory access paths. The MU may include one of more cache memories and TLBs to reduce latency and increase bandwidth of memory accesses. If the FEUs or ICUs include cache memory, then the MU may also be enabled to maintain coherency among the FEU and ICU caches and external memory.

The MCU allocates an ACE-enabled FEU, ICU, and FPU elements to form a CE for each active thread. When a thread does not require an FPU for a portion or all of its execution, the MCU may avoid allocating an FPU to the thread. The MCU controls the interconnection network to provide the necessary communication between the ACE-enabled FEU, ICU, and FPU elements of a CE. The MCU also controls the performance and power characteristics of each ACE-enabled FEU, ICU, and FPU, such as voltage level, degree of SMT and superscalar execution, aggressiveness of speculative execution, and size of caches enabled or allocated. As explained above, an ACE-enabled FEU, ICU, or FPU may execute multiple threads, so the MCU may assign more than one thread to one of those units.

In some embodiments an ACE-enabled processing system or processor may include one or more ACE-enabled SUs as specialized address-processing units to implement portions of x86-compatible memory accessing and management. In some embodiments an ACE-enabled processing system or processor may include one or more SPUs designed to execute application-specific operations. The SPUs may be faster, more efficient, or less power-consuming at tasks such as digital media processing, network packet processing, or speech recognition processing. In some embodiments an ACE-enabled processing system or processor may include one or more ACE-enabled RUs. The RUs may be dynamically configured by the MCU to operate as ICUs, RUs, hardware accelerators, or to provide legacy peripheral functions, according to time-varying system requirements. The time-varying requirements include any combination of desired thread-parallel processing, temperature range bounds, energy use, and compatibility requirements (such as 16-bit application execution and legacy peripheral accesses). Like other ACE-enabled units, ACE-enabled SUs, SPUs, and RUs are allocated to CEs by the MCU, and the MCU controls the interconnection network to provide appropriate communication thereto.

ACE-enabled microprocessors provide a highly flexible organization for trading off performance and power or battery life. A thread executes at highest performance when it is assigned a CE composed of the highest-performance resources configured with maximum parallelism and operating frequency. As described elsewhere herein, an ACE-enabled ICU forms a compact, tightly-coupled circuit for executing instructions whose latency has a relatively high impact on performance. The ACE-enabled FEU, FPU, MU, SU, SPU, and RU elements and the associated interconnection network provide buffering of sufficient instructions to enable high throughput for executing instructions that are more latency-tolerant. A thread may execute at minimum power when assigned a CE composed of the lowest-power resources configured with minimum parallelism and operating voltage.

Figure 3:
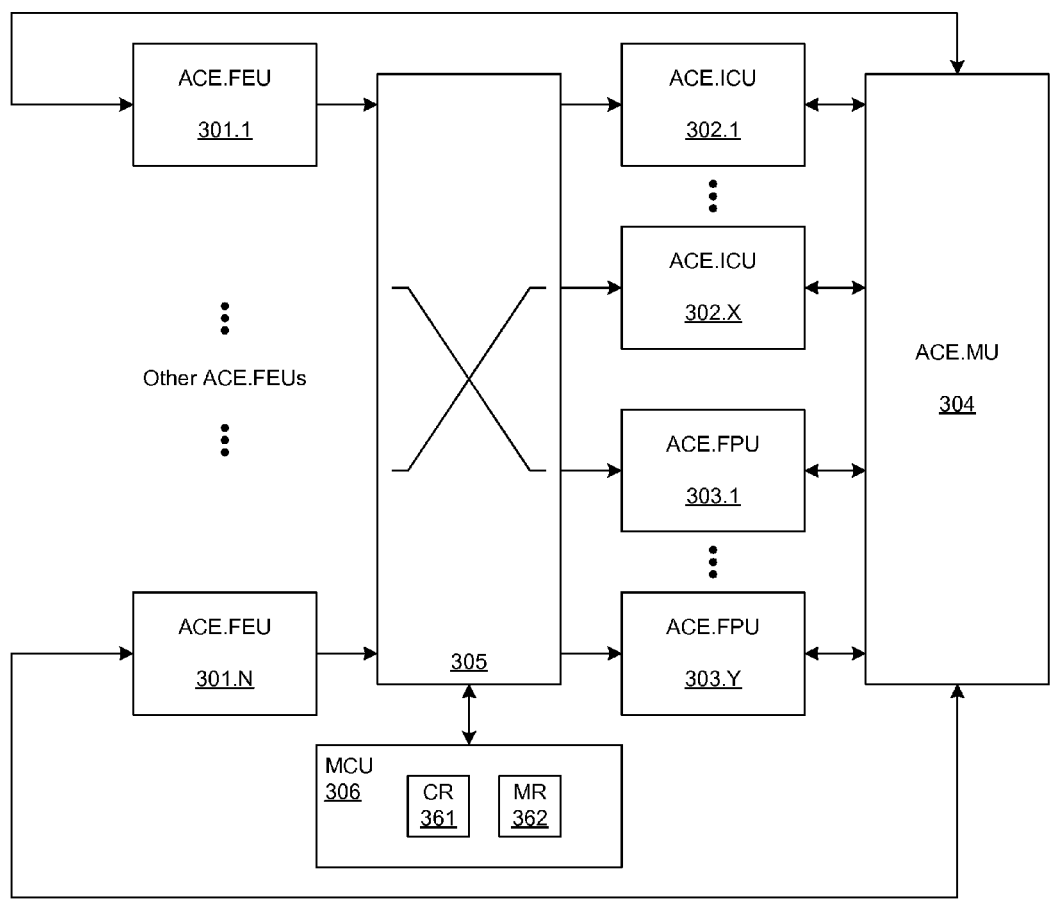
FIG. 3 illustrates various computing resources in accordance with an embodiment of an ACE microprocessor architecture.

FIG. 3 illustrates selected details of a processor in accordance with ACE architecture techniques. The system has a plurality of flexible computing resources, including an arbitrary number of ACE-enabled FEUs (illustrated as ACE.FEUs 301.1 . . . 301.N), an arbitrary number ACE-enabled ICUs (illustrated as ACE.ICUs 302.1 . . . 302.X), an arbitrary number ACE-enabled FPUs (illustrated as ACE.FPUs 303.1 . . . 303.Y), and shared ACE-enabled MCU 304 for communication between the other ACE-enabled units and external memory (not shown). Interconnection network Crossbar 305 couples the ACE.FEUs to execution resources including the ACE.ICUs and the ACE.FPUs, enabling full communication between each of the ACE.FEUs and the execution resources. MCU 306 controls the crossbar and various parameters and operational modes of the ACE-enabled units, receiving command information via Control Register(s) 361 and providing measured parameter information via Metric Register(s) 362.

In some embodiments the operational modes include a single-thread mode, a dual-thread mode, and a multiple-thread mode for processing operations relating, respectively, to one thread, two threads, and two or more threads. In some embodiments the operational modes correspond to respective configurations of an RU, such as a configuration compatible with processing according to an ICU, an FPU, an SU, or an SPU.

In some embodiments all of the ACE.ICUs are identical, forming a homogenous group of integer execution resources. In some embodiments one or more of the ACE.ICUs are distinct from others of the ACE.ICUs, forming a heterogeneous group of integer execution resources. Similarly, the ACE.FEUs and the ACE.FPUs may independently be homogenous or heterogeneous, according to various embodiments.

As illustrated, a single ACE-enabled MU provides for access by the other ACE-enabled units to external memory. Other external memory couplings and interfaces are possible, known by those of ordinary skill in the art, such as various forms of networks to connect multiple processors with memory subsystems.

The couplings between the ACE.FEUs, the crossbar, the ACE.ICUs, and the ACE.FPUs are illustrated as unidirectional to emphasize instruction fetch and execution flow. However, in some embodiments one or more of the couplings may operate in a bidirectional fashion (to return execution results such as branch direction outcome to fetch logic, for example). For clarity, various couplings between the MCU and the ACE-enabled units (relating to providing control information to the units and receiving metric information from the units) are omitted in the illustration.

The MCU receives targets and priorities from application or system software, or under direct instruction from a user, for performance (latency, throughput, and response time), power, battery life, and temperature. Software communicates these parameters by writing a set of fields in a control register (such as one or more registers implemented via Control Register(s) 361). The MCU collects measurements across the chip for various performance measures (such as instructions executed per clock, FP instructions executed per clock, and cache miss rates), power, and temperature, as well as external system measurements (such as battery life).

Under some circumstances, the MCU autonomously and dynamically adjusts the performance and power characteristics of the other units. For example, when no threads assigned to an FPU have executed an FP instruction for a predetermined or a programmed period of time, the MCU invokes power-savings techniques, such as altering supply or bias voltages to the FPU to reduce static power. For another example, when an "FP-idle" one of a plurality of threads assigned to an FPU has not executed an FP instruction for a (predetermined or programmed) period of time, the MCU may deallocate the FPU from the CE the FPU-idle thread is assigned to. The MCU may then optionally alter a thread mode of the FPU to reduce by one the number of threads the FPU is set up to process.

Under other circumstances, the MCU may make dynamic adjustments in response to targets set by software or by a user. For example, if measurements indicate that power usage is exceeding a specified target, then the MCU would reduce operating voltage or perform other adjustments, such as reassigning one or more threads to lower-power ICUs or FPUs. For another example, if a "hot" one of a plurality of ICUs is exceeding a maximum temperature threshold, then one or more threads may be reassigned to a "cool" one of the ICUs. The reassignment may include altering thread modes of the hot and the cool ICUs to reduce by one the maximum number of threads supported by the hot ICU and to increase by one the maximum number of threads supported by the cool ICU.

The MCU writes values corresponding to the received metrics to fields of a register for software to read (such as one or more registers implemented via Metric Register(s) 362). In this manner, software may also adapt target parameters dynamically in response to operating characteristics.

Computing Ensemble (CE) Allocation/Operation

Consider an ACE microprocessor embodiment including ACE-enabled flexible computing resources each capable of supporting one or two threads. The MCU allocates the resources into one or more groups operating as CEs, and assigns a respective thread to each of the CEs for execution. In response to an event (such as activation of a new thread or deactivation of an existing thread) the MCU may reallocate the resources of one or more existing CEs to one or more new CEs, and then reassign threads accordingly.

Figure 4A:
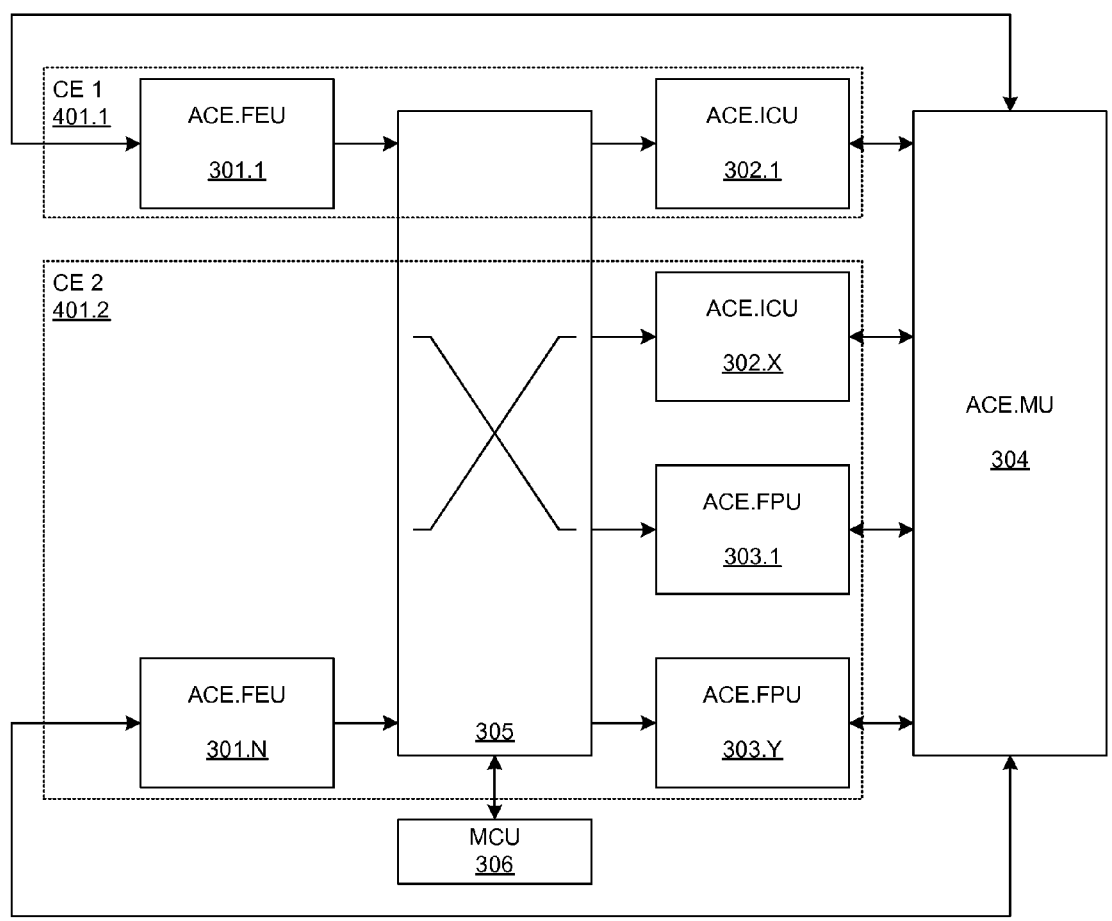
FIGS. 4a-4c illustrate the ACE embodiment of FIG. 3 allocated into various arrangements of CEs.
Figure 4B:
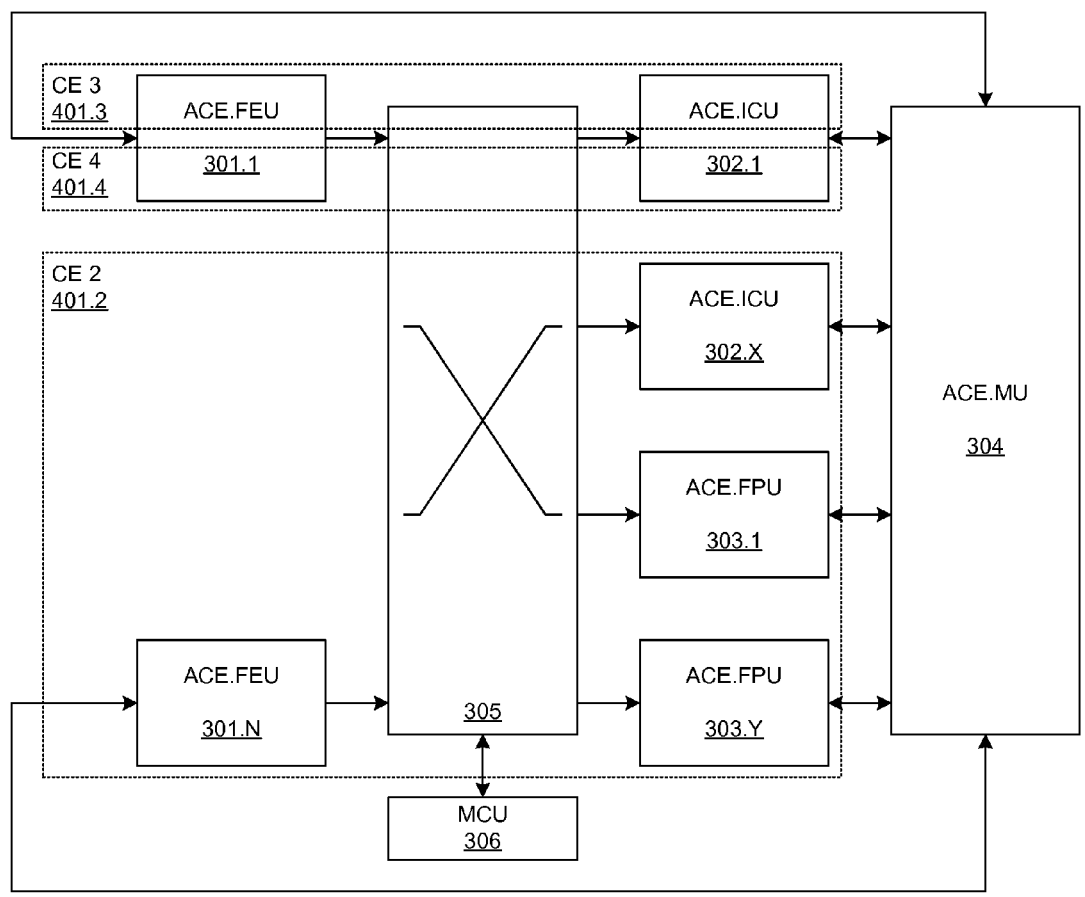
Figure 4C:
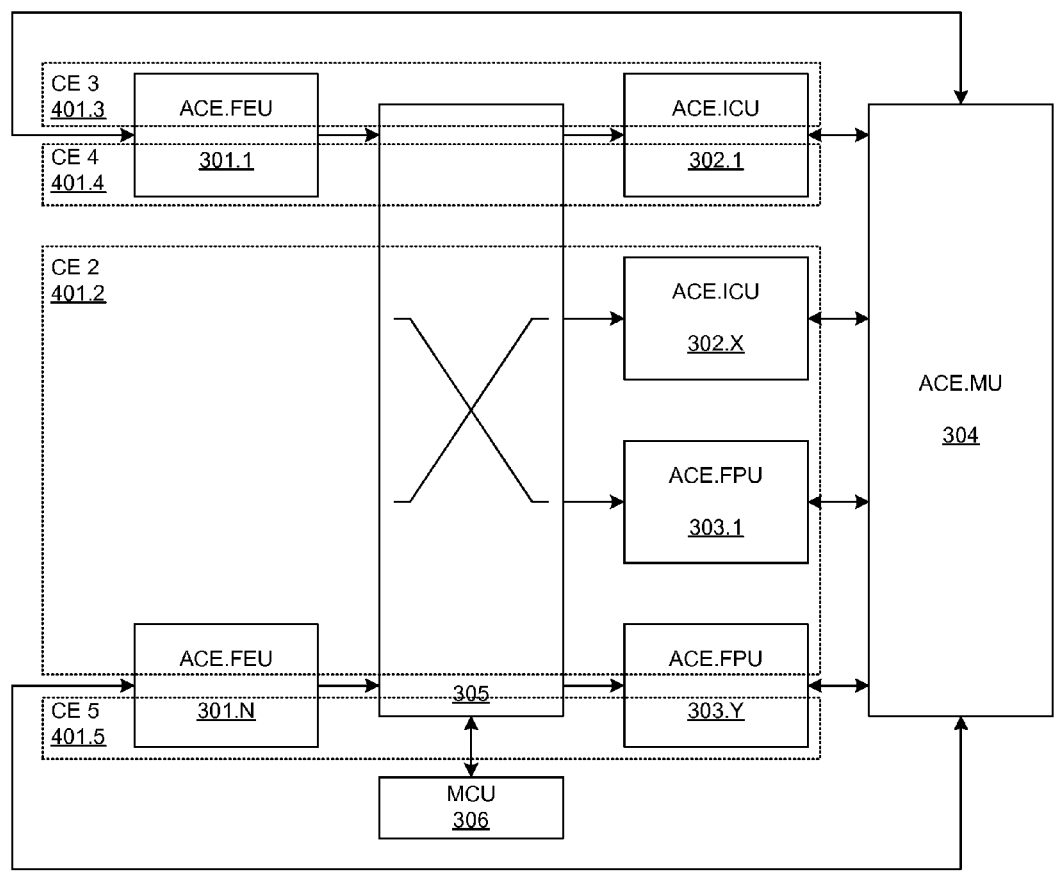

FIGS. 4a-4c illustrate the ACE embodiment of FIG. 3 (wherein each computing resource is operable to support either one or two threads) allocated into various arrangements of CEs. The hardware elements of each of FIGS. 4a-4c are identical to like-identified elements of FIG. 3. FIG. 4a illustrates the ACE embodiment of FIG. 3 allocated into CE 1 401.1 and CE 2 401.2. Allocated to the first CE are ACE.FEU 301.1 and ACE.ICU 302.1, and allocated to the second CE are ACE.FEU 301.N, all ACE.ICUs not allocated to the first CE (illustrated conceptually by ACE.ICU 302.X), and all ACE.FPUs (illustrated conceptually by ACE.FPUs 303.1 and 303.Y). MCU 306 controls the resource allocation and the thread assignment, directs Crossbar 305 to couple the ACE.FEUs to the appropriate ACE.ICUs and ACE.F-PUs, and assigns first and second threads for execution on the first and second CEs, respectively.

FIG. 4b illustrates the ACE embodiment of FIG. 4a after resources allocated to CE 1 401.1 have been reallocated to CEs 3 and 4 (401.3 and 401.4, respectively), under the direction of the MCU. The reallocation may be due, for example, to deactivation of the first thread previously executing on the first CE and activation of two new threads (i.e. third and fourth threads) executing respectively on the third and fourth CEs. As illustrated, the third CE is allocated "one-half" of each of ACE.FEU 301.1 and ACE.ICU 302.1 (i.e. allocated hardware in the units that support the first of two threads each of the units are capable of simultaneously supporting). Similarly, the fourth CE is allocated the remaining half of each of ACE.FEU 301.1 and ACE.ICU 302.1.

FIG. 4c illustrates the ACE embodiment of FIG. 4b after resources allocated to CE 2 401.2 have been partially reallocated to CE 5 401.5 under the direction of the MCU. The reallocation may be due, for example, to activation of a fifth thread assigned for execution on the fifth CE. As illustrated, "one-half" of each of ACE.FEU 301.N and ACE.FPU 303.Y have been deallocated from the second CE and have been allocated to the fifth CE.

Allocation (and deallocation) of ACE-enabled units to (and from) CEs, such as via an MCU, may be according to any combination of functional and non-functional requirements. An example of a functional requirement is processing of operations relating to an instruction stream including a specific class of instructions. For example, the class of instructions may include floating-point instructions that require processing of operations by an FPU. For another example, the class of instructions may include complex addressing-mode instructions that require processing of operations by an SU. Other classes of instructions that may require processing by particular units include special-purpose, SIMD, SSE, and media-specialized instructions. If a CE has not processed an instruction from one of the classes for a predetermined or a programmed time, then the corresponding unit may be removed (via deallocation) from the CE.

An example of a non-functional requirement is processing according to a specific thermal, power, or performance objective. For example, a CE may be formulated from ACE-enabled units to operate at a relatively low power, or to operate at a relatively high performance. Similarly, an existing CE may be reformulated to add (or remove) ACE-enabled units to operate at a different power or performance level.

ACE-enabled units may further be reconfigured, such as via an MCU, according to functional and non-functional requirements. As an example of a functional-directed reconfiguration, an RU may be dynamically reconfigured to process complex addressing-mode operations instead of or in addition to integer arithmetic operations upon encountering a complex addressing-mode instruction. If a predetermined or a programmed time interval transpires without encountering further complex addressing-mode instructions, then the RU may be dynamically reconfigured for processing only integer arithmetic operations. As an example of a non-functional-directed reconfiguration, an ICU may be directed to operate at a lower frequency (or voltage) in response to an objective to operate with lower power consumption. As another example, a unit may be reconfigured to process more (or fewer) operations in parallel to provide more (or less) performance.

In some usage scenarios, an ACE-enabled unit may be directed to operate according to more (or fewer) threads in order to support more (or fewer) CEs, according to various combinations of functional and non-functional requirements. Threads may be migrated between CEs to reach overall system thermal, power, and performance goals. Allocation of units to CEs and configuration(s) of unit(s) in CEs may be altered in response to changes in the overall system goals or in response to events. The events may include any combination of thread activation/deactivation, high/low temperature detection, low power/battery detection, and energy source switching (wall vs. battery). For example, in response to a high-temperature detection, units may be reallocated so that a minimum number of CEs are formed each with a minimum number of units. The units may be reconfigured for minimum power consumption by limiting parallel operation and reducing active storage array sizes. For another example, in response to detecting a switching to wall power, a maximum number of high performance CEs having units configured for high-performance may be formed. The units may be configured for high-performance by operating at a high frequency (and/or voltage) and activating maximum parallel processing.

ACE-Enabled PC NoteBook Embodiment (PC-NB)

ACE techniques may be used to implement an IBM PC-compatible notebook computer. Such an ACE-enabled PC NoteBook embodiment (or simply PC-NB) illustrates tradeoffs associated with ACE techniques. The PC-NB is enabled to execute a large base of software that it is distributed in binary form and also supports a wide variety of standard peripheral interfaces and devices. Users expect notebook computers to perform comparably to desktop computers when plugged into a wall supply or for limited periods with a battery supply. Users also expect notebook computers to operate for extended periods on battery supply, although somewhat reduced performance is acceptable. Such an application may benefit from a broad range of performance and power tradeoffs, as well as from near-continuous control over those tradeoffs.

In some embodiments a PC-NB microprocessor is capable of executing the x86 instruction set architecture, originally introduced by Intel Corporation and later supported by several other microprocessor manufacturers. One challenging characteristic of x86 implementations is that instructions are represented in several formats with length that varies between one and fifteen bytes. The x86 architecture also supports multiple operating modes, such as 16-bit real and protected modes, 32-bit protected mode, and 64-bit extended mode. The characteristics increase complexity of decoding and executing x86 instructions, and in some embodiments the PC-NB microprocessor translates the complex native instructions to a simpler instruction set to execute. An instruction of the simpler set is called a "Rop", referring to a RISC operation. RISC is an acronym for Reduced Instruction Set Computer, a form of architecture that uses a limited number of instruction formats, commonly of fixed length.

In some embodiments Rops are fixed-length, i.e. Rops to be processed by any unit are the same length. For example, integer, floating-point, and multimedia Rops may be 32-bit length operations. For another example, integer, floating-point, and multimedia Rops may be 35-bit operations. In some embodiments Rops are variable-length, i.e. Rops for a first unit are of a first predetermined length, and Rops for a second unit are of a second predetermined length. For example, integer Rops may be 32-bit length operations, floating-point Rops may be 34-bit length operations, and multimedia Rops may be 33-bit operations. For another example, integer and floating-point Rops may be 32-bit operations, and multimedia Rops may be 35-bit operations. These and all similar variations are contemplated.

In some embodiments of a PC-NB microprocessor, Rops are cached in a form of decoded-instruction cache (to avoid the complex decoding for each executed x86 instruction), improving performance by saving the time required for decoding x86 instructions, as well as simplifying decoding logic. Further performance improvements may be realized by storing and accessing a sequence of Rops to execute. Such a sequence is called a "trace", and the storage structure is called a TC.

Figure 5:
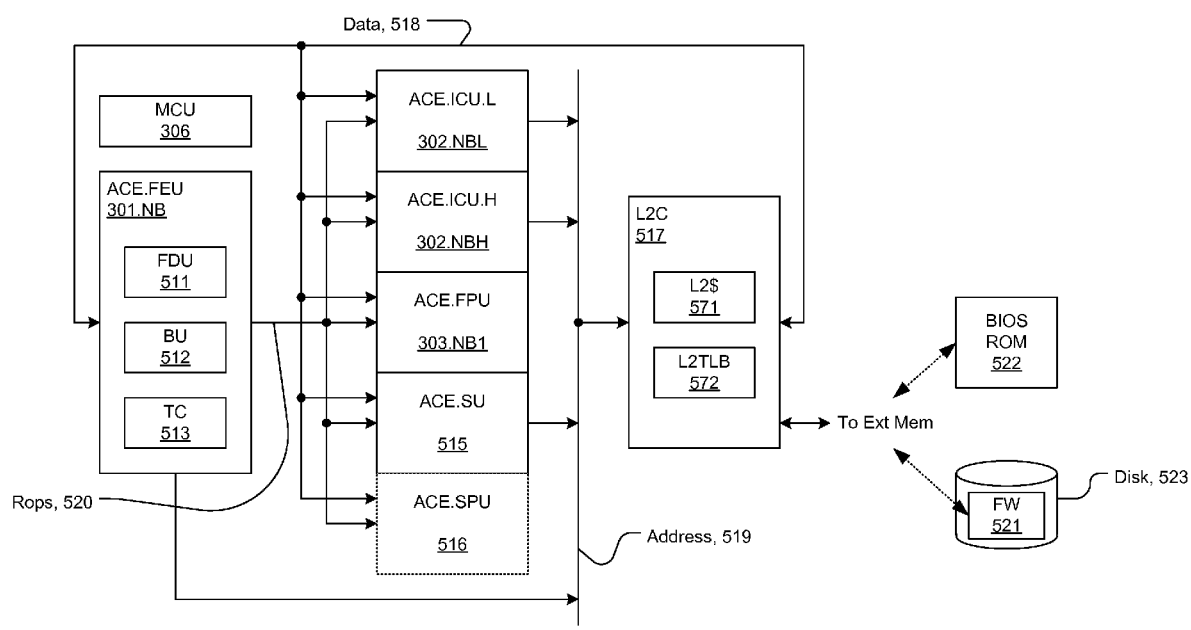
FIG. 5 illustrates selected details of a PC notebook system embodiment in accordance with an ACE microprocessor architecture.

FIG. 5 illustrates selected details of a PC notebook system embodiment in accordance with an ACE microprocessor architecture, and is conceptually an instantiation of a type of processor as illustrated in FIG. 3 with additional system context included. The system has a plurality of flexible computing resources, including ACE-enabled FEU 301.NB, ACE-enabled "low performance" ICU 302.NBL, ACE-enabled "high performance" ICU 302.NBH, ACE-enabled FPU 303.NB1, ACE-enabled SU 515, optional ACE-enabled SPU 516, and shared ACE-enabled second-level cache sub-system L2C 517.

Rops bus 520 provides for communication of a plurality of Rops in parallel from the ACE-enabled FEU to the ACE-enabled computational units (ACE.ICU.L 302.NBL, ACE.ICU.H 302.NBH, ACE.FPU 303.NB1, ACE.SU 515, and ACE.SPU 516). Address bus 519 provides for communication of a memory access request and associated address information from the ACE-enabled computational units enabled to produce memory requests (ACE.ICU.L 302.NBL, ACE.ICU.H 302.NBH, and ACE.SU 515) and the ACE-enabled FEU to the second-level cache sub-system. Bidirectional Data bus 518 provides for communication of memory load and store data between the ACE-enabled FEU and the ACE-enabled computational units.

The ACE-enabled FEU includes a single instance of a FDU 511 implementing logic for fetching x86 instructions from the second-level cache sub-system and decoding the instructions into a sequence of Rops. The FDU maintains context to fetch and decode one or more threads (such as two or three threads), according to various embodiments. In some embodiments the FDU includes an instruction cache and a small TLB along with instruction-prefetch and branch-prediction logic (not illustrated). In some embodiments the FDU decodes a simple, common x86 instruction into one of more Rops using combinational logic and a number of PLAs. More-complex and less-common instructions are decoded into a sequence of Rops using a microcode ROM. Exceptions are similarly handled by a sequence of Rops read from a microcode ROM. In some embodiments the FDU is enabled to decode a single simple instruction per clock, and in some embodiments the FDU is enabled to decode multiple instructions in parallel. The FDU may include any combination of a TLB, an instruction cache, one or more prefetch buffers, and branch-prediction logic, as well as other performance-enhancing techniques that are known by those of ordinary skill in the art, according to various embodiments.

The ACE-enabled FEU further includes BU 512 to assemble the Rops into traces, and TC 513 to store the traces. Recall that a "trace" is a collection of Rops that has been decoded from one or more basic blocks, and a basic block is a sequence of instructions that is terminated by a branch instruction. The BU implements a variety of algorithms to assemble Rops into traces. The algorithms that form the highest-performing traces generally take more time, so the BU selects among trace-forming algorithms based on the expected usage frequency of traces. Traces formed by the BU are stored in the TC for one or more threads (such as two or three threads), according to various embodiments. In some implementations the TC is organized as lines storing a plurality of Rops (such as two, four, six, or eight Rops) from one or more basic blocks (such as two, three, or four basic blocks). The TC is enabled to communicate a plurality of Rops in parallel (such as two, four, six, or eight Rops per clock period) to the ACE-enabled computational units via the Rops bus.

The ACE-enabled computational units include two integer computation and control units (ACE.ICU.L 302.NBL and ACE.ICU.H 302.NBH), an FP and multimedia calculation unit ACE.FPU 303.NB1, an address and segmented memory reference unit ACE.SU 515, and an optional application-specific processing unit ACE.SPU 516. In the illustrated embodiment the integer computation/control units are identical (although the ACE.ICU.H is coupled to a separate power supply). In other embodiments the integer units may be specialized according to differing power/performance tradeoffs. For example, the ACE.ICU.H may be targeted toward high maximum performance operation (potentially at a cost of higher power usage) by providing wider superscalar operation, a larger speculation and out-of-order window, and other techniques to improve performance. Continuing with the example, the ACE.ICU.L may be tuned for low-power operation (potentially at a cost of lower peak performance) by implementing narrow superscalar (or uni-scalar) operation, a small speculation and out-of-order window (or no speculation and in-order processing), and limitation (or removal) of other performance-improving elements. In some embodiments only a single integer computation/control unit is included, and in some embodiments three (or more) integer units are provided, each with identical or varying characteristics, according to embodiment.

In the illustrated embodiment (where the two integer computation/control units are identical), each ACE.ICU is enabled to receive a plurality of Rops per clock from the ACE.FEU (such as one, two, four, or eight Rops per cycle). Each ACE.ICU includes a register file to store context for one thread, and functional blocks including:

two blocks to calculate integer arithmetic and logical results;

a block to calculate integer shift results; and a block to calculate addresses and accesses memory for loads and stores.

In some embodiments one or more of the ACE.ICUs are enabled to support two or more threads simultaneously, such as by having register file state sufficient to concurrently store register context for each of the supported threads.

Each ACE.ICU is enabled to dispatch a Rop to each of the included functional blocks, up to a maximum of four (or two or one, according to embodiment) Rops per clock. Each of the blocks is enabled to execute an Rop whenever source operands for the Rop are available, enabling Rops to be executed both in parallel and out of sequential order. Each ACE.ICU further includes a DC and a DTLB with one access port. The DC is non-blocking and includes logic to handle memory references speculatively and out of sequential order.

The ACE.FPU is capable of performing FP, SIMD, and multimedia calculations for three categories of numerical instructions in the x86 architecture, commonly referred to as x87, MMX, and SSE. The FPU includes a register file to store context for one, two, or more threads, according to embodiment. The FPU includes separate logic blocks for addition, multiplication, and division. Each of the logic blocks is enabled to execute an Rop whenever the source operands for the Rop are available, thus enabling Rops to be executed both in parallel and out of sequential order The ACE.SU is enabled to execute instructions for legacy x86 architecture addressing modes, and may be implemented as a specialized form of ICU. The legacy x86 addressing modes include support for 16-bit software in real and protected modes that have specialized address calculations and associated protection checks that are unnecessary (or infrequently needed) for relatively recently developed 32- and 64-bit software. While users of a PC-NB expect legacy software to execute correctly, the users are willing to accept relatively lower performance for the legacy software, and thus ACE.SU embodiments may be targeted for relatively lower performance, enabling relatively lower complexity and reduced power implementations. In some embodiments the ACE.SU is capable of executing instructions for 16-bit x86 compatibility, and selected complex instructions for 32-bit x86 compatibility, such as calls through task-gate descriptors. In some embodiments the ACE.SU includes a register file enabled to hold context for multiple threads, and further includes a logic block for integer arithmetic, logical, and shift operations and another logic block for segmented address calculations with a TLB. In some embodiments the ACE.SU executes Rops one at a time, in sequential order The ACE.SPU is optionally included, in some embodiments, to provide support for more efficient (higher performance, lower power, or both) processing of digital media, network packets, speech recognition, or other similar computation-intensive workloads.

ACE-enabled second-level cache sub-system L2C 517 is enabled to receive requests for memory accesses from the ACE.FEUs, ACE.SU, and ACE.ICUs, and arbitrates Address bus 519 to accept a request from one of the units. The sub-system also arbitrates to transfer data with any of the ACE.FEUs, ACE.SU, and ACE.ICUs and the ACE.FPUs via Data bus 518. The sub-system includes second-level cache associative memory L2$ 571 enabled to store recently accessed memory locations, as well as streaming buffers (not illustrated) to access data having spatial locality but not temporal locality, and associated prefetch logic (also not illustrated). In some embodiments the second-level cache sub-system includes logic to interface with external memory and peripheral devices (such as BIOS ROM 522 and Disk 523 having FirmWare image 521), as well as logic to maintain consistency between external memory, second-level cache memory in the sub-system, and any first-level or other data caches within other units (such as DCs and/or TCs in ACE.FEUs and/or ACE.ICUs).

In some embodiments ACE-enabled second-level cache sub-system L2C 517 further includes a paging unit enabled to translate logical addresses to physical addresses, and a cache of recently used translations (managed as a TLB). The paging unit and the cache are illustrated collectively as L2TLB 572. The ACE.FEUs, ACE.SU, and ACE.ICUs request address translations using the same path as used for memory accesses (Address bus 519) and address translations are returned using the same path as for memory data (Data bus 518).

Each of the ACE-enabled units included in the PC-NB embodiment support a variety of features to modulate power and performance. Certain features are under local control of the units themselves, such as local clock gating for individual logic blocks within the unit. For example, the ACE.FPUs gate off clocks within included division blocks when idle (i.e. there are no divide instructions to execute). Other features, such as speculation and issue modes, cache size/organization, and threads are under global control of the MCU (see the "Master Control Unit" and "Power/Performance Features" sections, elsewhere herein, for more information).

ACE-enabled units (including front-end and execution units) may be asymmetric due to any combination of designed-in differences or operational environment differences. For example, ACE.ICU.L 302.NBL may be operated at a lower supply voltage, higher back-bias voltage, or lower frequency than ACE.ICU.H 302.NBH, thus resulting in lower-performance and/or lower power consumption of ACE.ICU.L 302.NBL compared to ACE.ICU.H 302.NBH. Similarly, ACE.ICU.L 302.NBL may be operated with fewer instructions or operations per cycle than ACE.ICU.H 302.NBH, even if ACE.ICU.L 302.NBL is designed with identical maximum processing capabilities as ACE.ICU.H 302.NBH. The units may differ according to enabled or provided storage facilities, such as caches, TLBs, register files, instruction queues, relative sizes of the storage facilities, or bandwidth provided or enabled per storage element, such as accesses per cycle. One of the units may provide clock or power gating while another unit may not. Some of the units may have a capability to mask changes in input vectors (when the unit is unused, for example), while others of the units may lack the capability or may be operated without activating the capability. Portions of a unit may be implemented with relatively high threshold transistors, while a substantially similar circuit in another unit may be implemented with some lower threshold transistors (such as to enable a higher maximum operating frequency). These and all similar variations are contemplated.

In some embodiments asymmetric ACE.FEUs differ according to numbers and widths of instruction fetch, decode, and build units. The ACE.FEUs may also vary according to number and capability of branch prediction units. The differences may be due to designed-in differences (such as one FEU lacking any branch prediction units) or may be due to operational differences (such as an FEU operated with one or more included branch prediction units disabled). Those of ordinary skill in the art will recognize other similar variations.

In some embodiments asymmetric ACE-enabled execution units may be unique based on number and capability of various execution circuits, depth of pipelines, and available parallel processing capability.

ACE-Enabled PC-NB Including a Reconfigurable Unit (RU)

Figure 6:
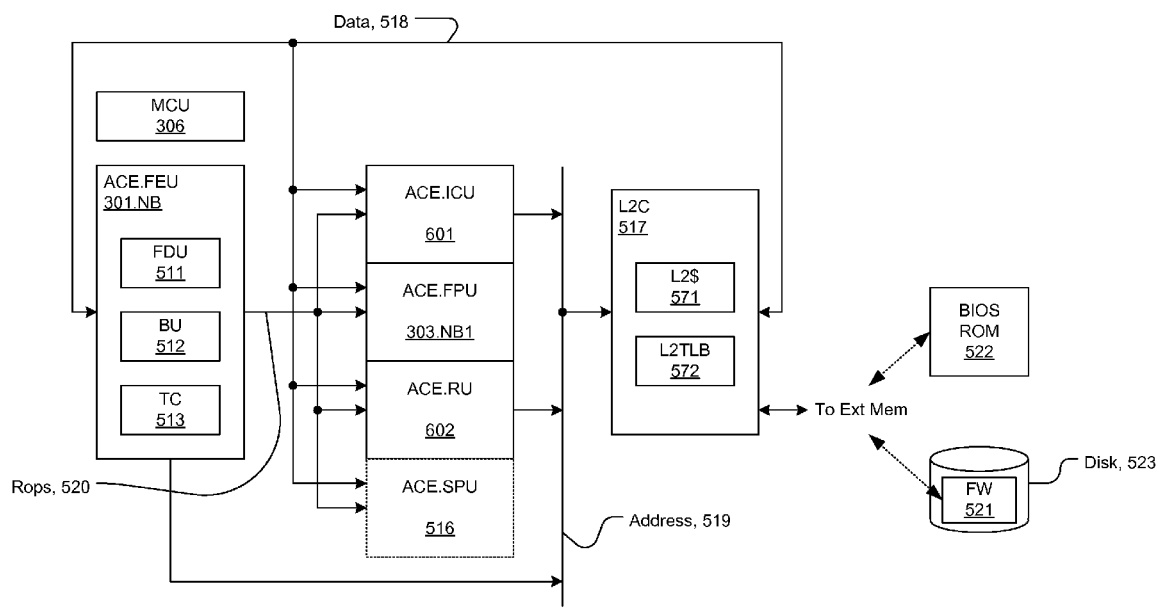
FIG. 6 illustrates selected details of a PC notebook system embodiment in accordance with an ACE microprocessor architecture that includes an RU.

FIG. 6 illustrates selected details of a PC notebook system embodiment in accordance with an ACE microprocessor architecture that includes an RU. FIG. 6 is similar in structure and operation to FIG. 5, except only a single ACE-enabled ICU is included (ACE.ICU 601) and the address and segmented memory reference unit (ACE.SU 515 of FIG. 5) has been replaced by an ACE-enabled RU (ACE.RU 602). The ACE.RU operates as one of the ACE-enabled flexible computational units, receiving Rops via Rops bus 520, communicating memory accesses via Address bus 519, and memory data via Data bus 518.

The ACE.RU is inherently reconfigurable, unlike the ACE.ICU, ACE.FPU, and ACE. SPU that are non-reconfigurable (or fixed-function) except for support of a variable number of threads. The ACE.RU may be (re)configured to implement at least various registers and a datapath with an ALU, a specialized address adder, and a multiplier. Those of ordinary skill in the art will understand how to implement the registers and the datapath using reconfigurable logic. In various embodiments the ACE.RU may optionally further implement a TLB, a data cache, or both.

In some embodiments the ACE.RU is configured to serve either as an SU or an additional ICU, thus implementing operations of a predetermined instruction set (i.e. the x86 instruction set). When the ACE.RU is configured as an SU, the ACE.RU registers are used to store integer data and segment descriptors. One portion of the ACE.RU datapath is configured to perform basic integer operations, including addition, bit-wise logic, and steps for iterating multiplication and division. Another portion of the datapath is configured to perform segmented address calculations and protection checks. When the ACE.RU is configured as an additional ICU, the registers are used to store only integer data, and the datapath is configured to perform addition, bit-wise logic, parallel multiplication, and iterative division.

In some embodiments reconfiguration of the ACE.RU is in response to the MCU recognizing an operation that none of the non-reconfigurable units are enable to process, and that the ACE.RU is also not currently configured to process. The MCU then directs reconfiguration of the ACE.RU to be compatible with processing the recognized operation. For example, consider a CE consisting of an ACE.ICU and an ACE.RU configured to operate as another ACE.ICU. A complex-addressing operation is recognized by the MCU as incompatible with processing by the ACE.ICU and the current configuration of the ACE.RU. In response, the MCU reconfigures the ACE.RU to be compatible with processing as performed by an ACE.SU, and the complex-addressing operation is sent to the reconfigured ACE.RU. In some embodiments reconfiguration of the ACE.ICU is under direct control of software, such as a specific directive to configure the ACE.RU to operate as an execution unit or a fixed-function unit. In some embodiments the reconfiguration is under combined control of software and the MCU.

In some embodiments the ACE.RU may be configured in more than one configuration that operates as an additional ICU, such as a first configuration targeted toward performance and as a second configuration directed to consume less power. Thus, a single ACE.RU may be flexibly reconfigured to implement either infrequently-executed 16-bit instructions (when configured, for example, as an SU), ordinary integer instructions at low power (when configured, for example as an ICU.L), or ordinary integer instructions at high performance (when configured, for example as an ICU.H).

In some embodiments the ACE.RU datapath is configured to implement operations to optimize execution specified by sequences of x86 instructions. For example, an application may include a loop that is executed many times to perform an accumulation of multiply operations. The x86 instruction set lacks an integer multiply-accumulate instruction, so the loop would include a multiply instruction followed by an add instruction. During execution of the application the ACE.RU datapath would be configured to perform a multiply-accumulate operation that could be executed at higher performance and less power consumption than execution of separate multiply and add instructions. The FDU or BU is enabled to recognize a sequence of x86 multiply and add instructions within a loop, and to translate the sequence to a Rop for the multiply-accumulate operation. The multiply-accumulate Rop thus corresponds to an optimization of the x86 instruction sequence of a multiply followed by an add, for which there is no direct representation in the predetermined x86 instruction set.

When the MCU recognizes the multiply-accumulate Rop, the MCU directs configuration of the ACE.RU to enable execution of the multiply-accumulate Rop, in addition to Rops for addition, bit-wise logic, multiplication and other operations that are directly represented in the x86 instruction set. Alternatively, the ACE.RU configuration may be accomplished under control of software, such as a compiler or operating system, or under combined control of software and the MCU.

In some embodiments the ACE.RU is configured to implement operations additional to or different than those that are directly represented by the predetermined x86 instruction set, i.e. operations that are represented by an alternate instruction set. Executing the alternate instruction set enables the ACE.RU to implement system functions that would otherwise be external to a microprocessor or otherwise require significant processing resources of the microprocessor. Implementing all or portions of the system functions via reconfiguration of the ACE.RU thus provides better cost, performance, and power consumption than implementing the system functions via software executing on the microprocessor or by fixed-function hardware external to the microprocessor.

For example, in some systems a large fraction of available microprocessor resources are used for networking processing, such as processing associated with TCP/IP functions. The ACE.RU may be configured to perform operations similar to a conventional fixed-function network processing hardware accelerator (such as a TCP/IP "offload" engine). The ACE.RU may be configured to perform other conventional fixed-function hardware accelerator operations such as standard cryptographic algorithms, including DES, RSA, and other similar encryption and de-encryption operations. The ACE.RU may be dynamically reconfigured to perform as any of the aforementioned fixed-function hardware accelerators, according to time-varying processing requirements. In some usage scenarios the ACE.RU is configured to perform as a hardware accelerator to implement operations that would otherwise consume a large (or largest) fraction of microprocessor execution resources. In some usage scenarios the ACE.RU is reconfigured to perform as another hardware accelerator in response to changing system performance requirements and varying workload characteristics.

For another example, in some systems there are infrequently-used or low-performance requirement system functions, such as support for various legacy peripheral devices associated with an IBM PC-compatible notebook computer (including a serial port, a floppy-disk drive, and a VGA display). The ACE.RU may be dynamically configured to emulate any of the legacy peripheral devices as needed by legacy applications. Thus, size, cost and power consumption of a system may be reduced by replacing fixed-function hardware that would otherwise be associated with several of the legacy devices by a single dynamically reconfigured ACE.RU.

When configured for operation to provide a legacy peripheral device function, the ACE.RU executes instructions that are optimized for processing the legacy peripheral device function. The instructions are not members of the predetermined x86 instruction set, and instead are members of an alternate instruction set. Instructions of the alternate instruction set that are executed by the ACE.RU may be stored internally to the ACE.RU or alternatively may be fetched by the FEU from memory and transferred to the ACE.RU. In some usage scenarios the ACE.RU may be controlled directly by an internal configured state-machine instead of or in addition to executing programmed instructions. Additionally, the ACE.RU may be configured to optimize memory references for specific types of processing. For instance, accesses to network packets may bypass one or more cache levels (such as any combination first- or second-level caches) to avoid cache pollution.

Embodiments are not restricted to a single ACE.RU. For example, one ACE.RU may be used to provide SU and/or ICU functions while one or more additional ACE.RUs may be used to provide hardware accelerator and/or legacy device functions.

Master Control Unit (MCU)

In some embodiments the MCU dynamically determines resources to assign to active threads and global features (or operational modes and configurations) of each ACE-enabled unit. When a thread is initiated, the MCU assigns the initiated thread to a CE including at least a portion of an FDU, a BU, a TCU, and an ACE.ICU. If the thread requires additional resources, such as an ACE.SU, an ACE.FPU, an ACE.SPU, or an ACE.RU, then the MCU allocates the required unit (or portion thereof) to the thread, and sets an appropriate mode and/or configuration. The setting may include activating a single- or a multiple-thread mode, or configuring an ACE.RU to operate as an ACE.ICU or ACE.SU, for example. If another thread is currently assigned to the allocated unit (or portion thereof), then the MCU switches out the context of the currently assigned thread (see the "Context Switch Optimization" section, elsewhere herein, for more information).

System firmware, executed via elements of the ACE-enabled PC-NB, assigns targets for minimum performance, maximum power, and maximum temperature, as well as priority between performance and power. The firmware selects one set of targets when the system operates on wall power and another set of lower-power targets when the system operates on battery power. An operating system may overwrite the targets assigned by the firmware. In some embodiments the firmware is part of a BIOS image, and may be stored in a ROM (such as BIOS ROM 522 of FIG. 5 or FIG. 6) included on a motherboard implementing all or portions of the PC-NB. All or portions of any combination of the firmware and the BIOS images may also be stored on a mass-storage device, for instance an optical or magnetic drive (such as Disk 523 having FirmWare 521 stored therein as illustrated in FIG. 5 or FIG. 6).

The MCU periodically samples measured performance, power, and temperature from the various units and global sensors. If all measures are below target, then the MCU reconfigures the ACE-enabled units to increases performance. Conversely, if all measures are above target, the MCU reconfigures the units to decrease power. If one of performance and power are above target and the other is below target, then the MCU either increases performance or decreases power according to the priority assigned by firmware or the operating system.

Performance/power points may be modified by any combination of changing operating frequency, altering supply voltage or back bias, reducing/increasing degree of super-scalar issue, enabling/disabling speculative and out-of-order processing, reallocation/deallocating cache resources, and other similar techniques, according to various implementations (see the "Power/Performance Features" section, elsewhere herein, for more information).

In some embodiments the MCU statically determines resources to assign to threads, such as a predetermined allocation of processing related to a fixed-function to a predetermined thread. In some embodiments the MCU statically sets up one or more operational modes or configurations of some ACE-enabled units. For example, ACE-enabled units included on an ACE-enabled microprocessor may be tested during manufacturing (such as during wafer test, packaged part test, or final system test) and characterized as operational (or non-operational) or characterized according to a respective maximum number of threads that may be supported. The characterization information may be stored in a non-volatile memory accessible by the MCU. During system power-on, start-up, or initialization, the MCU accesses the non-volatile memory and sets up any combination of CEs, thread modes of various units, and other unit configuration state accordingly. In some embodiments the MCU is limited to static configuring of ACE-enabled units or static formation of CEs.

In some usage scenarios a chip or system vendor may store distinctive information in the non-volatile memory so that systems that are otherwise identical may be configured for various performance and/or power-consumption characteristics according to the non-volatile memory. For example a chip vendor may specify, via a first non-volatile memory for a first chip, that the first chip is to operate as a member of a low-power family. The member of the low-power family may include a relatively small number of CEs, or CEs having relatively low power usage. The chip vendor may specify, via a second non-volatile memory for a second chip (the second chip being identical to the first chip) that the second chip is to operate as a member of a high-performance family. The member of the high-performance family may include a relatively large number of CEs, or CEs having relatively high performance. Similarly, a system vendor may specify, via non-volatile memories associated with respective chips, that the respective chips are to operate in systems of various performance and/or power envelopes. Alternatively the system vendor may specify (via the non-volatile memories) that an ACE.RU is to be configured as a relatively high-performance fixed-function element such as a TCP/IP offload engine in a first product line and configured as a relatively high-performance cryptographic engine in a second product line.

Those of ordinary skill in the art will recognize that the foregoing static and dynamic assigning, mode setting, and configuring may be arbitrarily combined. For example, manufacturing testing performed via an electronic circuit tester, a burn-in environment, or a system test/configuration board may be used to mark (or record in a non-volatile memory) portions of units as non-operational by limiting a maximum number of threads. The MCU may use the marking to statically define CEs and to set appropriate thread modes. During operation the MCU may then perform the aforementioned dynamic assigning, mode setting, and configuring, subject to the marking. The non-volatile memory may be implemented by various technologies, such as fuse-programmable, anti-fuse-programmable, and flash-programmable. The non-volatile memory may be implemented in the MCU, outside of the MCU but included in a microprocessor including the MCU, or external to the microprocessor (such as a portion of BIOS ROM 522 of FIG. 5 or FIG. 6). In some of the embodiments having the non-volatile memory in the microprocessor, the microprocessor is operable in a special mode to enable accessing (reading and/or writing) the non-volatile memory via pins of the microprocessor.

Context Switch Optimization

As described elsewhere herein, the MCU may change assignment of resources for a thread, for example, by changing assignments of all or portions of an ACE.ICU or an ACE.FPU from one thread to another. When a change is made, it is necessary to move context of the thread from a released unit to a newly assigned unit. The thread context includes values of registers as well as copies of values stored within a cache memory (such as in the DC of the ACE.ICU of the released unit). Time required to switch context represents an overhead for an ACE-enabled microprocessor that negatively impacts performance and power when the assignment of resources is changed for only a short period of time. Consequently, it is desirable to minimize the time required to perform a context switch.

In some embodiments a context switch is performed by the released unit writing values (from registers of the released unit, for example) to memory and then the assigned unit reading the values from memory (into registers of the assigned unit, for example). The aforementioned "via-memory" technique is simple but is limited by available memory bandwidth and inherent latency (due to cache misses, for example).

In some embodiments a context switch is performed via a provided direct path to transfer register values between the released unit and the assigned unit. In some PC-NB embodiments the direct path is also the path that the ACE.ICU unit (or units) use to access memory. In some embodiments the direct path is several bytes wide (such as four, eight or 16 bytes), enabling a plurality of registers to be transferred in parallel.

In some usage scenarios, the MCU may make a thread inactive when it is determined that the thread is idle or that its resources should be assigned to a higher-priority thread. At such a thread switch, it is necessary to save context of the inactive thread. One way of saving context of the inactive thread is to store register values of all units assigned to the thread. Another way of saving context, a so-called "lazy context switch" may reduce time to save and restore context by storing only context of the assigned resources for the inactive thread. For example, a thread may be assigned to a CE including portions of an ACE.FEU and an ACE.SU, but no ACE.ICU. The MCU may assign the newly active thread a CE including portions of the ACE.FEU and ACE.ICU. For this case, it is not necessary to save context of the inactive thread from the ACE. SU. The MCU instead maintains a record of an identifier for the inactive thread that has its context stored in the ACE. SU. If (and only if) another thread is assigned to a CE that requires the ACE.SU, then context of the ACE.SU registers is saved. If no other thread is assigned to the ACE.SU before the inactive thread is reactivated, then the context save and restore for the ACE.SU is completely avoided.

In some embodiments, techniques used to switch context of cache memory differ from techniques for registers. For example, the cache of the released unit may be invalidated; and if the cache uses a write-back strategy, then any modified values in the cache are written to memory before invalidating. Then the cache could be turned off to reduce power. As an alternate example, the cache memories may include logic to maintain coherency with each other, as well as main memory, so no flush or invalidation is necessary. In either case, when operating in a new context, the assigned unit would form its own cache context by accessing locations as needed from main memory or another cache.

Several techniques are possible to reduce the time to switch cache context. First, it is known that one principle for caching is retention of recently accessed memory locations ("temporarily locality"). Therefore, one way to reduce context switch time is to transfer the most recently used lines from the cache of the released unit to the cache of the assigned unit. The released unit may record most recently used lines, for example by a circuit maintaining a reference stack, and transfer the lines to the assigned unit when a switch occurs. An arbitrary number of lines may be transferred, but keeping the number a relatively small fraction of the total cache capacity reduces unnecessarily transferred lines. A similar, but simpler technique may be used when the releasing unit has a write-back cache. When the released unit flushes modified cache lines to memory, the assigned unit preloads (also called "snarfs") the lines into its own cache. Yet another technique implements a mechanism within the assigned unit to prefetch a line when a miss occurs. The prefetched line is located at the next successive address following the missed line. In some PC-NB embodiments the prefetch mechanism is enabled when a context is switched. The mechanism remains enabled for a period of time that may be fixed or variable, for example, until a certain number of misses has occurred or until a number of lines have been prefetched but not used.

Power/Performance Features

In some embodiments all ACE-enabled units are designed to locally (and independently) gate clocks. In addition, dynamic power/performance tradeoffs under control of the MCU are made possible by various units implementing one or more power/performance features. For example, some units are designed to disable selected performance features to reduce power consumption, some units are designed to support more than one thread (to enable simultaneous use of the unit in a plurality of CEs), some units are enabled to support a plurality of cache sizes (or allocations per thread) and/or organizations, and some units may be coupled to various power supplies to enable independent voltage scaling. The following table summarizes some examples of power and performance features of various ACE0 enabled units under MCU control.

| ACE-Enabled Unit | Microarchitecture | Voltage Scaling | Threads |
|---|---|---|---|
| BU | Simple schedule: single instruction, single block supply | common | 1/2 |
| FDU | Disable: prefetch, branch prediction | common supply | 1/2 |
| FPU | | common supply | 1/2 |
| ICU.H | Narrow issue, disable speculative load/store | separate supply | 1/2 |
| ICU.L | Narrow issue, disable speculative load/store | common supply | 1 |
| L2C | Disable: cache way, cache set | common supply | |
| RU | | common supply | |
| SU | | common supply | |

-continued

| ACE-Enabled Unit | Microarchitecture | Voltage Scaling | Threads |
|---|---|---|---|
| TC | Disable: cache way, cache set | common supply | 1/2 |

In some embodiments, during modification of an operational parameter (such as a supply voltage or a frequency of a clock), there is a period of time when the clock is not stable. For example, if the supply voltage is increased (or decreased) then in some implementations there may be a period of time including and/or following the change in voltage where an oscillator generating the clock temporarily produces an improper (or unstable) clock. Similarly, if the oscillator is directed to increase (or decrease) the frequency of the clock, then in some implementations there may be a time interval during and/or following a resulting frequency transition period during which the clock is not usable. While the clock is unusable, any threads executing on resources affected by the unusable clock are temporarily stopped.

In some embodiments the stopped threads remain assigned to the affected resources (or computing ensembles) throughout the transition period. In some embodiments the MCU directs migration of the stopped threads to new resources (or computing ensembles) unaffected by the unusable clock, and then restarts the threads, thereby enabling the stopped threads to be resumed earlier than if the threads were not migrated. When the clock returns to being usable, the MCU may migrate the restarted threads back to the original computing ensemble, or the MCU may leave the restarted threads assigned to the new resources, according to various usage scenarios.

Some usage scenarios change the supply voltage and the clock frequency in a coordinated fashion. For example, the supply voltage and the frequency may both be increased (or decreased). In some embodiments the supply voltage is ramped up (or down) before the clock frequency is changed. In some embodiments the frequency is ramped up (or down) before the supply voltage is changed. Some implementations reduce the clock instability time interval by increasing voltage before frequency (when ramping up) or by decreasing frequency before voltage (when ramping down).

CONCLUSION

Although the foregoing embodiments have been described in some detail for purposes of clarity of understanding, the invention is not limited to the details provided. There are many ways of implementing the invention. The disclosed embodiments are illustrative and not restrictive.

It will be understood that many variations in construction, arrangement and use are possible consistent with the teachings and within the scope of the claims appended to the issued patent. For example, interconnect and function-unit bit-widths, clock speeds, and the type of technology used may generally be varied in each component block. The names given to interconnect and logic are merely illustrative, and should not be construed as limiting the concepts taught. The order and arrangement of flowchart and flow diagram process, action, and function elements may generally be varied. Also, unless specifically stated to the contrary, the value ranges specified, the maximum and minimum values used, or other particular specifications (such as number, arrangement, and capability of functional units; resource control techniques; and the number of entries or stages in registers and buffers), are merely those of the illustrative embodiments, may be expected to track improvements and changes in implementation technology, and should not be construed as limitations.

Functionally equivalent techniques known to those of ordinary skill in the art may be employed instead of those illustrated to implement various components, sub-systems, functions, operations, routines, and sub-routines. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware). Specific variations may include, but are not limited to: differences in partitioning; different form factors and configurations; use of different operating systems and other system software; use of different interface standards, network protocols, or communication links; and other variations to be expected when implementing the concepts taught herein in accordance with the unique engineering and business constraints of a particular application.

The embodiments have been illustrated with detail and environmental context well beyond that required for a minimal implementation of many of aspects of the concepts taught. Those of ordinary skill in the art will recognize that variations may omit disclosed components or features without altering the basic cooperation among the remaining elements. It is thus understood that much of the details disclosed are not required to implement various aspects of the concepts taught. To the extent that the remaining elements are distinguishable from the prior art, components and features that may be so omitted are not limiting on the concepts taught herein.

All such variations in design comprise insubstantial changes over the teachings conveyed by the illustrative embodiments. It is also understood that the concepts taught herein have broad applicability to other computing and networking applications, and are not limited to the particular application or industry of the illustrated embodiments. The invention is thus to be construed as including all possible modifications and variations encompassed within the scope of the claims appended to the issued patent.

What is claimed is:

1. A microprocessor comprising:
   one or more front-end circuits and one or more execution circuits, at least one of the execution circuits being operable in at least a single-thread mode and a multiple-thread mode and capable of simultaneously retaining architectural state of at least two threads of a plurality of threads;
   an interconnection circuit enabled to provide selective communication between each of the front-end circuits and each of the execution circuits;
   a memory circuit enabled to provide access to external memory by each of the front-end circuits and one or more of the execution circuits;
   a master control circuit;
   wherein with respect to the interconnection circuit, the front-end circuits, and the execution circuits, the master control circuit is enabled during microprocessor initialization to establish selected unestablished characteristics of a first set of microarchitecture characteristics and further enabled to subsequently alter selected characteristics of a second set of microarchitecture characteristics based at least in part on a plurality of samples over time of at least one type of behavior measurement;

wherein for each of a plurality of active threads to be processed of the plurality of threads, the master control circuit is enabled to establish a respective transient circuit collection allocated from unallocated portions of the circuits;

wherein each of the transient circuit collections is collectively enabled to fetch, decode, and execute its respective active thread; and wherein at least one of the front-end circuits is operable to translate variable-length macro instructions to a plurality of operations, wherein at least some of the operations refer to at least some of the architectural state, the selective communication comprises parallel communication of at least a portion of the operations from the at least one front-end circuit simultaneously to a plurality of the execution circuits, and the plurality of execution units are operable to perform the portion of the operations at least in part in response to the communication thereof.

2. The microprocessor of claim 1, further comprising a non-volatile memory programmed with information based on tests performed during manufacture of the microprocessor and referenced by the master control circuit during the establishment of the selected characteristics of the first set of microarchitecture characteristics.

3. The microprocessor of claim 1, wherein the microprocessor is operable with a configuration store comprising at least one of a Read Only Memory (ROM) and a Randomly Accessible read/write Memory (RAM).

4. The microprocessor of claim 3, wherein execution of a function by the microprocessor as specified by the configuration store directs the master control circuit to control the interconnection circuit and to configure the circuits.

5. The microprocessor of claim 1, wherein the execution circuits comprise an integer execution and control circuit.

6. The microprocessor of claim 5, wherein the integer execution and control circuit is enabled to direct pipeline processing of one or more of the operations.

7. The microprocessor of claim 1, wherein the execution circuits comprise at least one of a floating-point execution circuit, a segmentation circuit, and a reconfigurable circuit.

8. The microprocessor of claim 1, wherein the at least one type of behavior measurement comprises at least one of:
an available battery life measurement,
an available battery energy measurement,
a cache performance measurement,
an available spare processing cycles measurement,
a superscalar instruction issue measurement,
a speculative processing measurement,
an out-of-order processing measurement,
a power consumption measurement,
a temperature measurement,
a performance measurement, and
a power-performance measurement.

9. The microprocessor of claim 1, wherein the microprocessor is enabled to implement a general purpose computing system capable of high-performance while supporting a large base of software covering a wide variety of applications and while further supporting a wide variety of peripheral interfaces and devices.

10. A method comprising:
allocating as-yet unallocated computing resources to first and second transient circuit collections, each of the transient circuit collections having respective power-performance behavior;

based at least in part on a plurality of samples over time of at least one type of behavior measurement, dynamically reassigning an active thread from the first transient circuit collection for execution on the second transient circuit collection;

configuring a first one of the computing resources to operate in a single-thread mode;

configuring a second one of the computing resources to operate in a multiple-thread mode and to simultaneously retain architectural state of at least two threads;

translating variable-length macro instructions into operations executable by the computing resources and corresponding to the active thread, at least some of the operations referring to at least some of the architectural state;

communicating in parallel at least a portion of the operations to a plurality of the computing resources simultaneously, and in response to the portion of the operations, the plurality of computing resources performing the portion of the operations;

wherein at least one of the acts of configuring is according to at least one of a static technique and a dynamic technique;

wherein the first computing resource is allocated to the first transient circuit collection; and wherein the second computing resource is simultaneously allocated to the first and the second transient circuit collections.

11. The method of claim 10, wherein the dynamically reassigning is directed to improve at least one of
performance of the active thread,
power consumed during processing of the active thread,
power-performance of the active thread, and
a maximum temperature of one of the computing resources.

12. The method of claim 10, wherein the dynamically reassigning is based at least in part on an event.

13. The method of claim 12, wherein the event comprises at least one of
a thread activation,
a thread deactivation,
a high-temperature detection,
a low-temperature detection,
a low-power detection,
a switching to battery power,
a switching from battery power,
a low battery life detection,
a low battery energy detection,
a switching to wall power,
a switching from wall power,
a request for high-performance operation, and
a request for long-duration operation.

14. The method of claim 10, further comprising assessing a metric.

15. The method of claim 14, wherein the metric comprises at least one of
an available battery life metric,
an available battery energy metric,
a cache performance metric,
an available spare processing cycles metric,
a superscalar instruction issue metric,
a speculative processing metric, an out-of-order processing metric,
a power consumption metric,
a temperature metric,
a performance metric, and
a power-performance metric.

16. The method of claim 14, wherein the dynamically reassigning is based at least in part on a function of the metric.

17. The microprocessor of claim 10, wherein the at least one type of behavior measurement comprises at least one of:
an available battery life measurement,
an available battery energy measurement,
a cache performance measurement,
an available spare processing cycles measurement,
a superscalar instruction issue measurement,
a speculative processing measurement,
an out-of-order processing measurement,
a power consumption measurement,
a temperature measurement,
a performance measurement, and
a power-performance measurement.

18. A computer-readable medium having a set of instructions stored therein which when executed by a processing element causes the processing element to perform functions comprising:
based at least in part on a plurality of samples over time of at least one type of behavior measurement, arranging to execute a first thread on a first set of execution units from a pool of execution units;
arranging to execute a second thread on a second set of execution units from the pool of execution units;
wherein each of the threads corresponds to respective sequences of operations produced by translating respective first and second sequences of variable-length macro instructions;
wherein at least a multiple-thread capable one of the first set of execution units is included in the second set of execution units and is capable of performing in parallel at least one respective operation from each of the sequences of operations, and is further capable of simultaneously retaining architectural state of at least the first and the second threads, at least some of the operations referring to at least some of the architectural state;
wherein the arranging to execute the first thread comprises configuring a routing network to deliver the operations of the first thread to the first set of execution units, and the arranging to execute the second thread comprises configuring the routing network to deliver the operations of the second thread to the second set of execution units, and to simultaneously deliver at least a portion of the operations of the second thread in parallel to the second set of execution units; and
wherein in response to the delivery of particular ones of the operations, the execution units are adapted to perform the particular operations.

19. The computer-readable medium of claim 18, wherein the first set of execution units comprises at least one of
an integer execution unit,
a floating-point execution unit,
a segmentation unit,
a special-purpose unit,
a memory interface unit, and
a reconfigurable unit.

20. The computer-readable medium of claim 18, further comprising arranging to execute a third thread on the first set of execution units.

21. The computer-readable medium of claim 2, further comprising saving context associated with the first thread from the first set of execution units.

22. The computer-readable medium of claim 21, wherein the saving context saves all context associated with the first thread.

23. The computer-readable medium of claim 21, wherein the saving context omits at least some context associated with the first thread.

24. The microprocessor of claim 18, wherein the at least one type of behavior measurement comprises at least one of:
an available battery life measurement,
an available battery energy measurement,
a cache performance measurement,
an available spare processing cycles measurement,
a superscalar instruction issue measurement,
a speculative processing measurement,
an out-of-order processing measurement,
a power consumption measurement,
a temperature measurement,
a performance measurement, and
a power-performance measurement.

* * * * *